(12) United States Patent
Galkin et al.

(10) Patent No.: US 11,712,856 B2
(45) Date of Patent: Aug. 1, 2023

(54) LOW PROFILE HEAT TRANSFER PRESS

(71) Applicant: Stahls' Inc., Sterling Heights, MI (US)

(72) Inventors: Anton Galkin, Sterling Heights, MI (US); Benjamin B. Robinson, Sterling Heights, MI (US); Weiyu Zhang, Pittsburgh, PA (US)

(73) Assignee: Stahls' Inc., Sterling Heights, MI (US)

( * ) Notice: Subject to any disclaimer, the term of this patent is extended or adjusted under 35 U.S.C. 154(b) by 180 days.

(21) Appl. No.: 17/176,534

(22) Filed: Feb. 16, 2021

(65) Prior Publication Data

US 2021/0252797 A1 Aug. 19, 2021

Related U.S. Application Data

(60) Provisional application No. 62/977,436, filed on Feb. 17, 2020.

(51) Int. Cl.
| | |
|---|---|
| *B29C 65/18* | (2006.01) |
| *B29C 65/00* | (2006.01) |
| *B30B 15/06* | (2006.01) |
| *B30B 1/04* | (2006.01) |
| *B30B 15/34* | (2006.01) |
| *B41F 16/00* | (2006.01) |
| *B41F 16/02* | (2006.01) |
| *B29L 31/48* | (2006.01) |

(52) U.S. Cl.
CPC .......... *B29C 65/18* (2013.01); *B29C 66/8748* (2013.01); *B29C 66/9231* (2013.01); *B30B 1/04* (2013.01); *B30B 15/064* (2013.01); *B30B 15/34* (2013.01); *B41F 16/0046* (2013.01); *B41F 16/02* (2013.01); *B29L 2031/48* (2013.01)

(58) Field of Classification Search
CPC .... B30B 1/02; B30B 1/04; B30B 1/10; B30B 1/12; B30B 15/062; B30B 15/064; B30B 15/34; B41F 16/0046; B41F 16/02
See application file for complete search history.

(56) References Cited

U.S. PATENT DOCUMENTS

| | | | | |
|---|---|---|---|---|
| 3,979,248 A | * | 9/1976 | Kussmaul | G05G 15/08 |
| | | | | 156/359 |
| 5,252,171 A | * | 10/1993 | Anderson | B30B 1/12 |
| | | | | 156/359 |

(Continued)

FOREIGN PATENT DOCUMENTS

EP 2606761 A1 6/2013

*Primary Examiner* — Matthew Katcoff
(74) *Attorney, Agent, or Firm* — Fishman Stewart PLLC

(57) ABSTRACT

A heat press includes a lower platen and an upper swing arm attached to a base, and an upper platen having a heater therein. The upper platen is coupled to the upper swing arm via a piston rod, and operable via a linkage. The linkage includes a coupler linked between the upper swing arm and a print handle and includes an input link that rotationally couples the print handle to the piston rod such that a motion of the print handle moves the piston rod up or down. The heat press includes a control housing that is electrically coupled to the heater. The upper swing arm is operable to swing the upper platen away from the lower platen when not in contact with the lower platen. The control housing remains in a stationary position regardless of a position of the upper swing arm.

22 Claims, 20 Drawing Sheets

(56) References Cited

U.S. PATENT DOCUMENTS

| | | | | |
|---|---|---|---|---|
| 5,435,883 | A * | 7/1995 | Myers | B41F 16/02 156/583.9 |
| 8,042,588 | B2 * | 10/2011 | Robinson | B30B 1/04 156/583.8 |
| 2007/0017641 | A1 * | 1/2007 | Kenney | B41F 16/02 156/583.8 |
| 2016/0250816 | A1 * | 9/2016 | Robinson | B30B 15/0029 100/35 |
| 2018/0036980 | A1 * | 2/2018 | Robinson | B41F 16/0046 |
| 2018/0361730 | A1 * | 12/2018 | Robinson | B41F 16/02 |

* cited by examiner

LOW PROFILE HEAT TRANSFER PRESS

CROSS-REFERENCE TO RELATED APPLICATION

This application claims priority to U.S. Provisional Patent Application Ser. No. 62/977,436, filed on Feb. 17, 2020, the contents of each of which are hereby expressly incorporated by reference in their entireties.

TECHNICAL FIELD

The exemplary illustrations described herein are generally directed to presses, such as heat transfer presses that include platens.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. Graphic images and lettering may generally be accurately and quickly transferred to the apparel without bleeding or partial interruptions in the bonding of the transfer, as long as the presses can be operated at a predetermined temperature for a predetermined time and at a predetermined pressure.

The presses must be able to accommodate many variations in the arrangement of transfers and apparel, as well as the types of transfers and apparel materials available. Moreover, the presses accommodate a wide variety of temperatures, pressures, and time intervals associated with application of indicia to a garment. Due to the desire for flexibility and economic factors, presses have traditionally been manually operated, i.e., they often rely on a user (e.g., an operator) to control at least (a) the force applied through the platens and (b) the length of time the force is applied with a mechanical apparatus.

The accuracy and precision of the temperature, and the pressure and the time duration for which these parameters are applied to the transfers, are particularly important to complete an efficient bonding of the transfers to materials, and can be difficult to accomplish in an accurate and repeatable manner. Often, heat presses are set up for long term use in a single location, and sufficient room for operation with respect to other equipment in the area, or with respect to other heat presses, is typically not an issue.

However, heat presses may be operated in any number of environments and conditions, and may be set up for use, or taken down after use, on short notice. For instance businesses may operate in fairs, tradeshows, and the like and may require operation in less than ideal conditions. Heat presses may be set on high-top tables for operation, on the ground, they may be placed in small or tight operating spaces, or they may be placed anywhere for operation so long as power can be provided and a stable position or base for placing the heat press may be found. Thus, the conditions for setup, takedown, and operation can be cramped and inconvenient for use with traditional heat presses.

Heat presses are generally not designed for such operation, and are typically designed to operate in more established environments where sufficient room for operation is available.

Accordingly, there remains a need for an improved heat press.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description.

DETAILED DESCRIPTION

Figure 1:
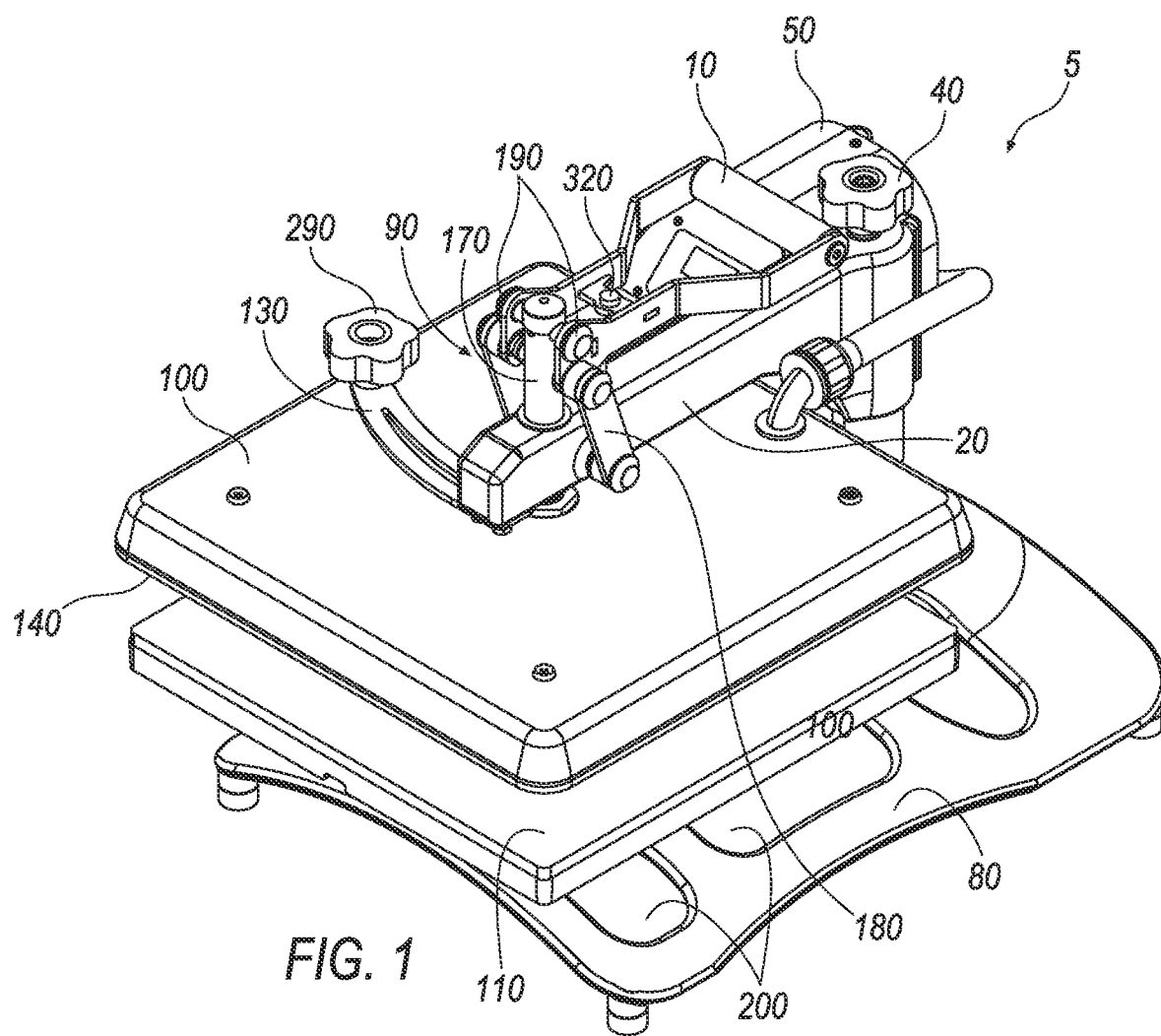
FIG. 1 is a perspective view of an exemplary press.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Various exemplary illustrations are provided herein of exemplary presses, e.g., for applying indicia to garments by application of heat. According to one exemplary illustration, a press may include an upper platen, and a lower platen disposed below and generally aligned with the upper platen. The press may further include a support head adapted to move the upper platen between an open position, wherein the upper and lower platens are spaced away from one another, and a closed position, wherein the upper platen is pressed against the lower platen.

A heat press includes a lower platen and an upper swing arm attached to a base, and an upper platen having a heater therein. The upper platen is coupled to the upper swing arm via a piston rod, and operable via a linkage. The linkage includes a coupler linked between the upper swing arm and a print handle and includes an input link that rotationally couples the print handle to the piston rod such that a motion of the print handle moves the piston rod up or down. The heat press includes a control housing that is electrically coupled to the heater. The upper swing arm is operable to swing the upper platen away from the lower platen when not in contact with the lower platen. The control housing remains in a stationary position regardless of a position of the upper swing arm.

Exemplary illustrations are described in detail below. General discussion applies to all the figures as follows, with discussion specific to each figure later provided.

Referring generally to the figures, an exemplary heat press 5 is shown according to the disclosure. Press 5 includes a print handle 10 that is operable to move aspects of press 5 between open and closed positions. An upper swing arm 20 is operable to move up and down, causing compression of, for instance, a transfer onto a shirt, during operation, via handle 10. A safety bolt 30 that operates as a fail-safe in the event of a material failure of press 5 during operation. A pressure adjuster 40 is operable by a user to raise and lower components so that, during operation, an amount of pressure is controlled (i.e., increased or decreased) as applied to the exemplary heat transfer. A control housing 50 provides both control and display features, and is stationary with respect to movement of upper swing arm 20. As an alternative to control housing 50 mounted on press 5, a stand-alone controller 60 is positioned away from press 5 and according to the disclosure is positioned aside from press 5 in an example where stand-alone controller 60 can be selectively positioned with respect to press 5 by a user.

Control housing 50, when positioned on press 5, includes an exemplary Z-bracket support 70 that supports control housing 50. Press 5 includes a base casting 80 that is configured to provide support to components of press 5 during operation. Press 5 includes a linkage 90 that is operable via print handle 10, and linkage 90 is coupled to an upper platen 100. A lower platen 110, is beneath upper platen 100 when press 5 is in its operable position for applying the exemplary heat transfer. Control housing 50, or the alternative stand-alone controller 60, are coupled to press 5 via a cable housing 120. A swing arm 130 is coupled to upper swing arm 20 and provides a rotating operation to upper swing arm 20, linkage 90, and other components that are mechanically coupled thereto. Upper platen 100 includes an upper platen heater 140 which selectively applies heat to the transfer during operation of press, with power and other control features provided from control housing 50 via cable housing 120. Lower platen 110 is coupled to base casting 80 via rubber bushings 150 that provide flexible and compliant response in the position of lower platen 110 when pressure is applied thereto. A lower platen base 160 provides coupling between rubber bushings 150 and other components of press 5. Control housing 50 is advantageous due to the ability to provide readout information to a user, without the user having to move to the side along with the rotation of the upper platen in order to read what is on the display. Likewise, in a very cramped arrangement the optional stand-alone controller 60 may likewise be positioned in hard to reach locations if, as stated, the press is positioned to operate in a cramped or tight environment. Base casting 80 itself includes a low profile and an upwardly convex arrangement, with a convex side facing downward, that provides for flexible arrangement, flexing downward and against the curvature of base casting 80, thereby providing both structural stability and flexure in a low profile design, augmenting the low profile nature of press 5.

Upper platen 100 is supported by a piston rod 170, which is operable via linkage 90 and print handle 10, in one example as a 4-bar linkage. Linkage 90 includes a coupler or follower 189 that provides mechanical coupling between upper swing arm 20 and piston rod 170. An input link 190 is coupled to piston rod 170 and allows rotational operation thereof via print handle 10 to provide for mechanical operation of linkage 90. Base casting 80 includes apertures 200 that are selectively positioned to remove or reduce overall weight of press 5, while ensuring that base casting 80 retains sufficient mechanical strength and flexibility to provide reliable and long life operation. Lower platen base 160 includes a lower platen base aperture for positioning of components such as piston rod 170. In one example a base plate mating screw or nub is provided for locating components such as the lower platen with respect to base casting 80. In such fashion, a low profile of press 5 is maintained by having a compact operation of linkage 90, allowing a user to move upper platen 100 up and down with a compact and efficient movement of print handle 10.

Proximity sensors include a proximity sensor first component 220 and a proximity sensor second component 230 for sensing, quantifying, and displaying to a user an elevation of the platens with respect to each other during operation of press 5. A controller readout 240 provides a user with a visual display to a user, such as temperature and pressure settings, and temperature and pressure actual values, if such values are taken with appropriate sensors (such as a temperature sensor in the upper platen or a pressure sensor in the upper platen, as examples). Operation of the proximity sensor may be controlled, such that during operation a visual or audible indicator may be triggered if, for instance, the upper platen is raised above a certain or desired height. For instance, in a cramped or tight setting it may be desirable to raise upper platen 100 only slightly above lower platen 110, by limiting motion of print handle 10. If too far then print handle 10 or upper platen 100, for instance, may be caused to interfere or engage against another object. As such, the proximity sensor may be programmed or have its parameters set to warn a user (via audible or visual indicator) to not exceed a certain height, which may be indicated by controller readout 240. A visual or audible indicator may also be triggered after the upper platen remains in the closed position for a pre-determined interval of time to avoid overheating the indicia or garment.

Upper platen 100 may be rotated out of the way of lower platen 110, and range of rotation is limited via a collar 250, collar cutout 260, and collar stop 270. Range of linkage motion may be controlled by a range limiter, such as a linkage stop that is in the vicinity of a gap 280. A swing arm handle 290 is coupled to upper platen 100 and swing arm 130, providing a convenient and safe feature for a user to rotate components away from lower platen 110 when, for instance, upper platen 100 may be hot during operation of press 5. In such fashion, rotational motion of upper platen 100 may be limited or reduced, allowing for compact operation of press 5 in tight quarters and in a cramped or tight environment, to avoid knocking components of press 5 into other objects, but selective arrangement and use of collar 250, collar cutout 260, and collar stop 270.

Base casting 80 may include a hole or aperture for mechanical coupling of components thereto. A support post 310 provides mechanical support of swing arm 130 and ultimately the components that are supported by swing arm 130, including upper platen 100. Range of motion of linkage 90 is limited by engagement of parts during its operation, and hard contacts are eliminated using a first bumper 320 and a second bumper 330. In such fashion, up and down motion of upper platen 100 may be limited or reduced, allowing for compact operation of press 5 in tight quarters and in a cramped or tight environment.

Press 5 includes lower platen 110 mounted on base casting 80, and upper swing arm 20 supporting upper platen 100 above lower platen 110. Force may be applied to upper platen 100 through print handle 10. Print handle 10 imparts a force from upper platen 100 to lower platen 110. In one example, platens 100, 110 may include a work structure of a machine tool and a generally flat plate of a press configured to press a material, e.g., a garment, to allow placement of indicia on the garment.

Upper swing arm 20 may position upper platen 100 in a substantially parallel alignment with lower platen 110 as it approaches a closed position. Moreover, pressure of the closed position of upper platen 100 can be varied, by varying a location of upper platen 100 with respect to lower platen 110 via pressure adjuster 40. As a result, regardless of the thickness of the material, the transfers to be applied, or the thickness of the support pads to be used between upper and lower platens 100, 110, the alignment of the upper and lower platens 100, 110 avoids uneven pinching of the material and the transfers positioned between upper and lower platens 100, 110. Pads (not shown) and/or rubber bushings 150 may also assist the pressure distribution regardless of irregularities in the thicknesses of the heat applied transfers and the apparel to which it is applied.

At least one of the platens, e.g., upper platen 100, includes heating element, such as upper platen heater 140, which may be a conventional electrically resistive heating elements and the like, which may be formed as serpentine or otherwise wound throughout the surface area of upper platen 100. The heating element is coupled to a typical power supply in a housing such as control housing 50 through a switch and/or a controller, and may be configured for adjusting the temperature of the heating element, e.g., by way of the controller. Further, the temperature of the heating element may be adjusted by adjusting power to the heating element. Upper platen 100 may also carry a thermo-couple sensor, RTD probe, NTC thermistor or similar device (not shown) which is wired in a conventional manner to generate temperature information for the controller, which may display such information via display or controller readout 240. Readout 240 may thus be mounted for exposure to an area occupied by a press operator as typically positioned for manipulating and controlling the press. The electrical circuit for the heating element may also include a temperature control such as a thermostat.

In addition, in one example lower platen 110 includes a heating element and a separate controller, such as stand-alone controller 60 for applying heat to lower platen 110, according to the disclosure.

The controller may generally include computational and control elements (e.g., a microprocessor or a microcontroller). The controller may generally provide time monitoring, temperature monitoring, pressure monitoring, and control, as examples. Readout 240 may further include various readout displays, e.g., to allow display of a force, temperature, or time associated with operation of the press. Moreover, readout 240 may allow for manipulation of the controller by a user, e.g., by way of a touchscreen interface (not shown). Controller 50 or stand-alone controller 60 may also have input capabilities, to set time, temperature, and the like, via for instance a touch screen or via push buttons, as example.

As noted above, upper swing arm 20 generally supports and aligns upper platen 100 with respect to lower platen 110. Upper swing arm 20 may also be pivotable about an axial support that is, in the illustrated example, colinear with pressure adjuster 40. Upper platen 100 may thereby be positioned away from lower platen 110, to allow placement of a garment upon lower platen 110. Repositioning of upper platen 100 also allows for convenient removal of lower platen 100 for change out of lower platen 110, to either replace with another size platen, or to replace or repair a damaged platen. Control of rotation of upper swing arm 20 is via a 'hard stop', which includes a collar 250, a collar cutout 260, and a collar stop 270, as will be further illustrated. In such fashion, rotational movement of upper platen 100 may be limited or reduced, allowing for compact operation of press 5 in tight quarters and in a cramped or tight environment.

It is contemplated that other platen sizes used in the industry may benefit from the disclosed subject matter, as well. For instance, platen sizes may include 6" by 6", 6" by 20", 16" by 16", 15" by 15", or 11" by 15", as examples.

Flex in the mechanism allows for even pressure in conjunction with the bushings during the prints. Thus, when print handle 10 is engaged to press upper platen 100 against lower platen 110 (such as for heating a garment during use), flex occurs in lower platen 110 via rubber bushings 150 that flex, without vibrating (i.e., the bushing dampen any vibration in favor of providing a spring or 'bounce' response to pressure being applied). Flexing occurs also within upper swing arm 20, as well as components supporting upper swing arm 20, to prevent over-pressuring against the platens, and to provide overall even pressure between them and importantly against the garment.

Figure 2A:
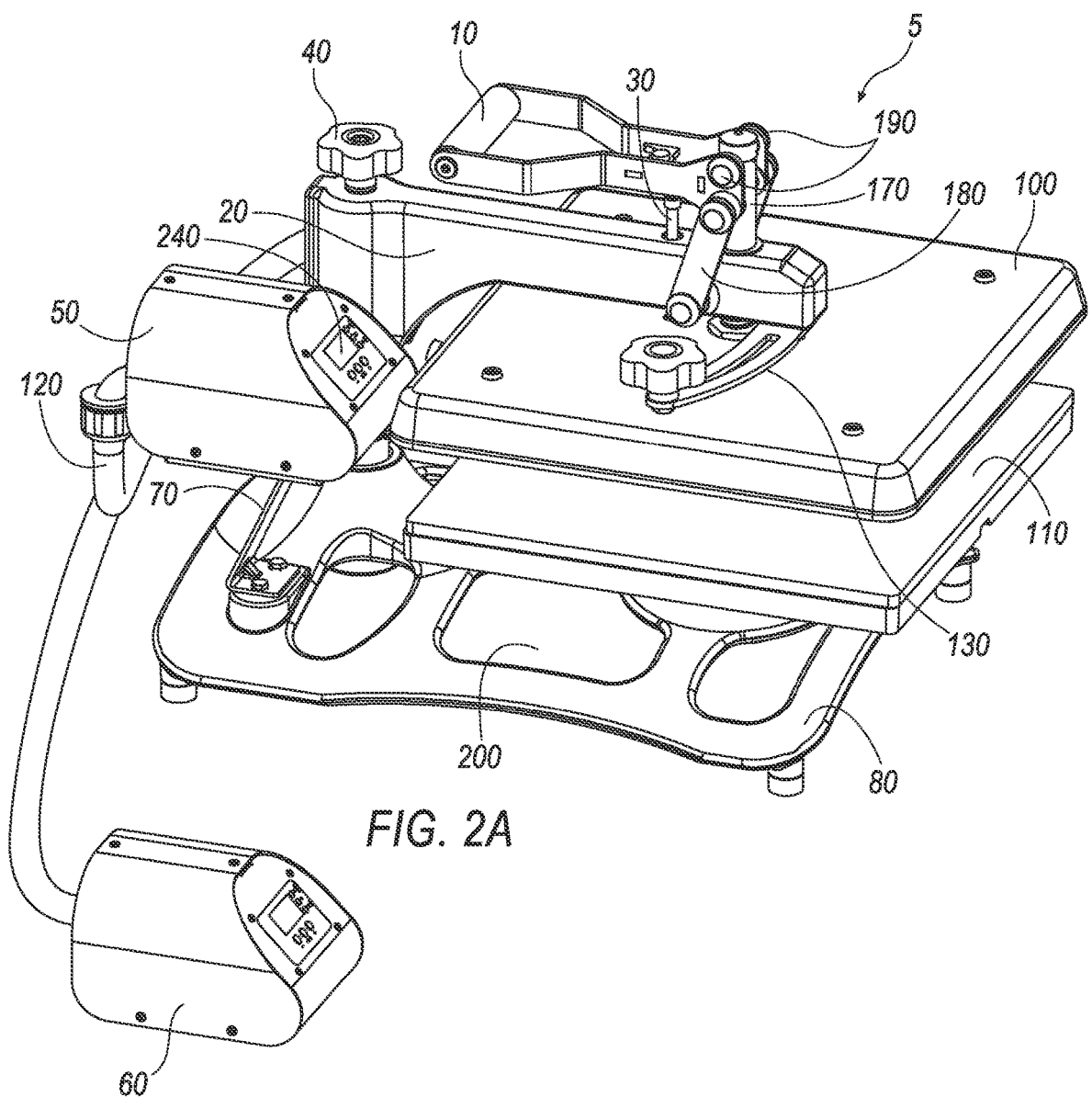
FIG. 2A illustrates a perspective view of the exemplary press in an open position.
Figure 2B:
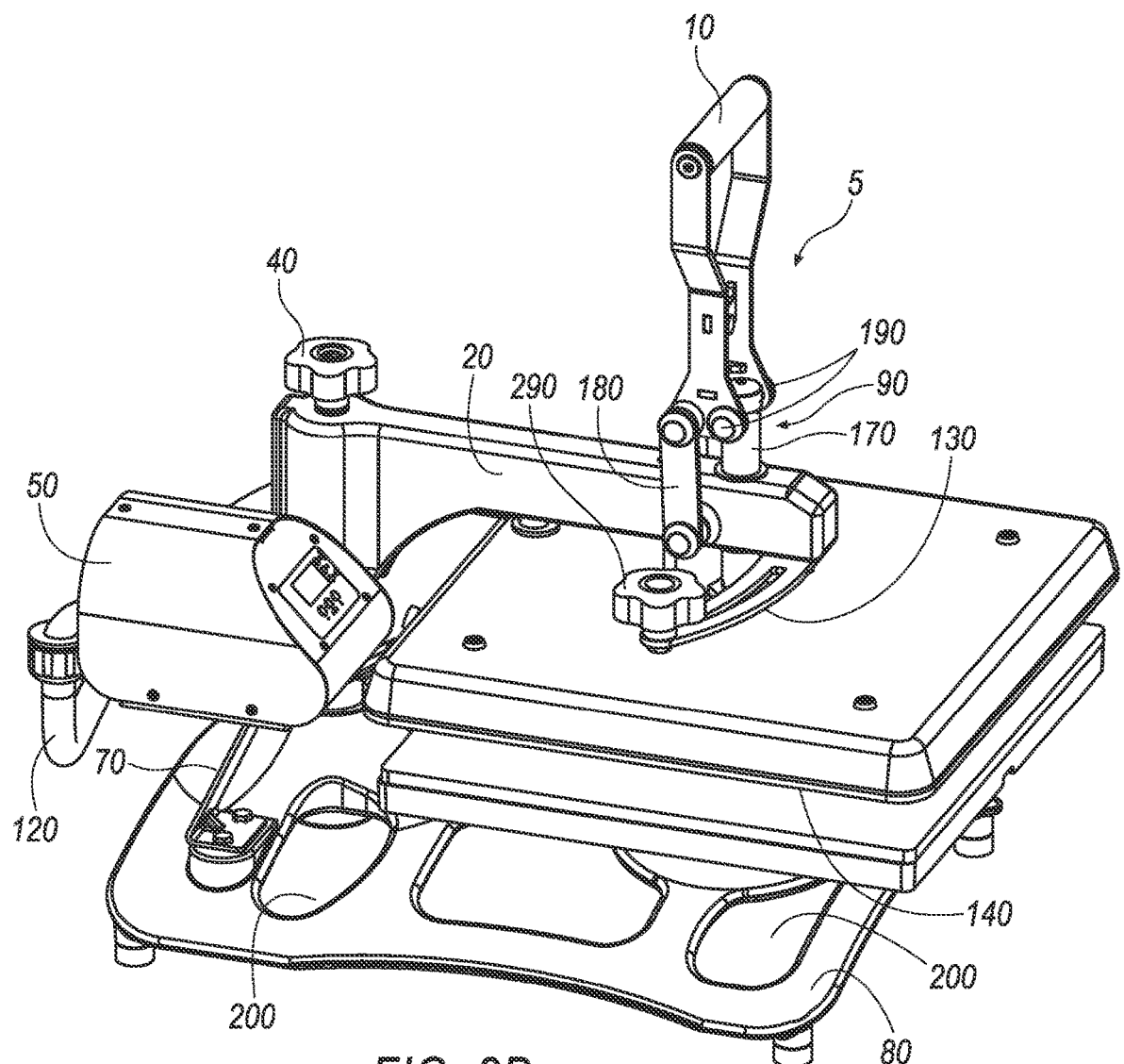
FIG. 2B illustrates a perspective view of the exemplary press in a partially open position.
Figure 2C:
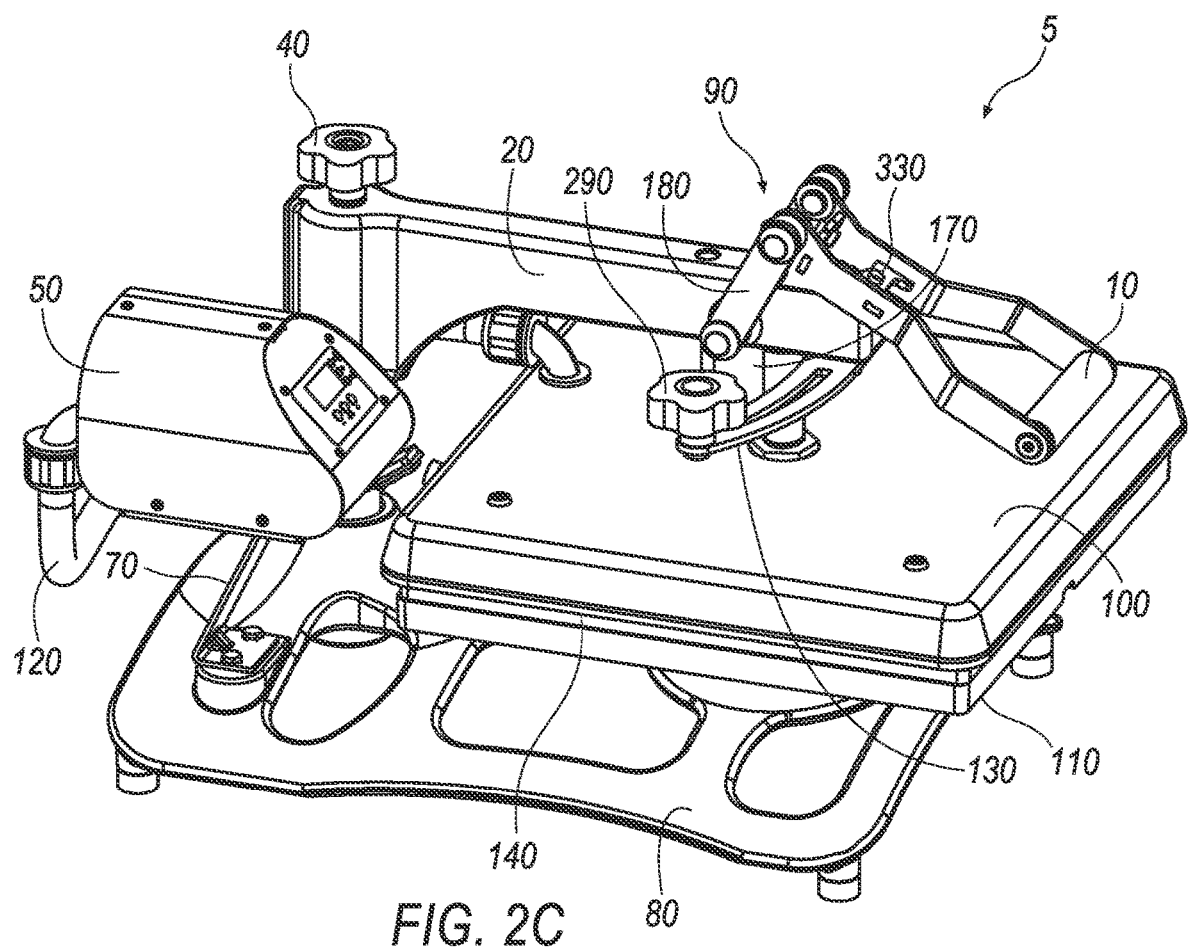
FIG. 2C illustrates a perspective view of the exemplary press in a closed position.

FIG. 1 is a perspective view of an exemplary press according to the disclosure, and shows heat press 5 having upper platen 100 supported by upper swing arm 20. A height of upper platen 100 may be adjusted with respect to lower platen 110 by adjusting a height of upper swing arm 20 via pressure adjuster 40. Print handle 10 may be engaged by pulling print handle forward, which causes upper platen 100 (having heater 140) to lower via a linkage 90. The operation is illustrated in FIGS. 2A, 2B, and 2C. FIG. 2A illustrates a perspective view of the exemplary press in an open position, FIG. 2B illustrates a perspective view of the exemplary press in a partially open position, and FIG. 2C illustrates a perspective view of the exemplary press in a closed position. Pressure adjuster 40, when turned, causes upper swing arm 20 to move up or down, which further impacts the total pressure applied between platens 100, 110 when print handle 10 is engaged.

In one example and referring particularly to FIG. 2A, in lieu of control housing 50 being positioned in a stationary position on press 5, a stand-alone controller 60 is shown that, in one example, may be coupled to a heater contained within lower platen 110. In such fashion, heater power and overall heating may be separately controlled—with heat to upper platen 100 controlled via control housing 50, and heat to lower platen 110 controlled via stand-alone controller 60.

Figure 3A:
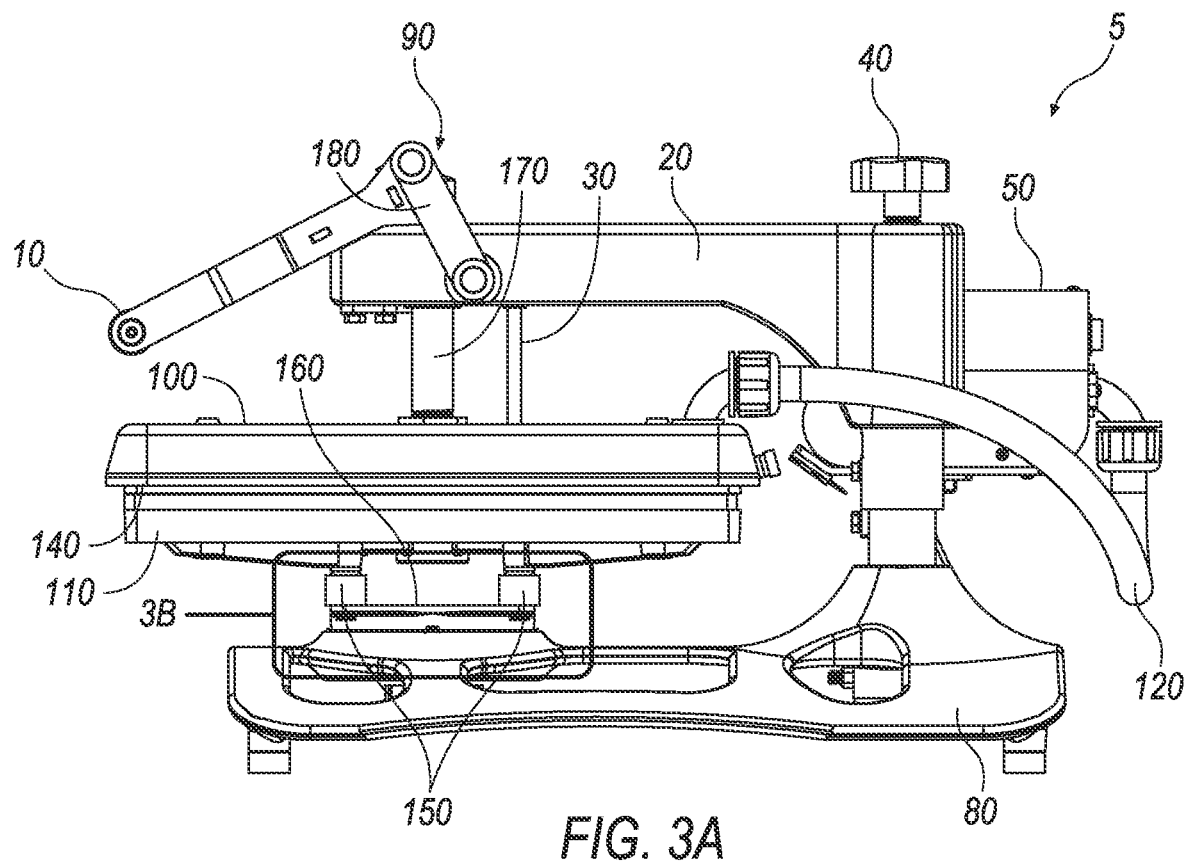
FIG. 3A illustrates a side view of the exemplary press in the closed position.
Figure 3B:
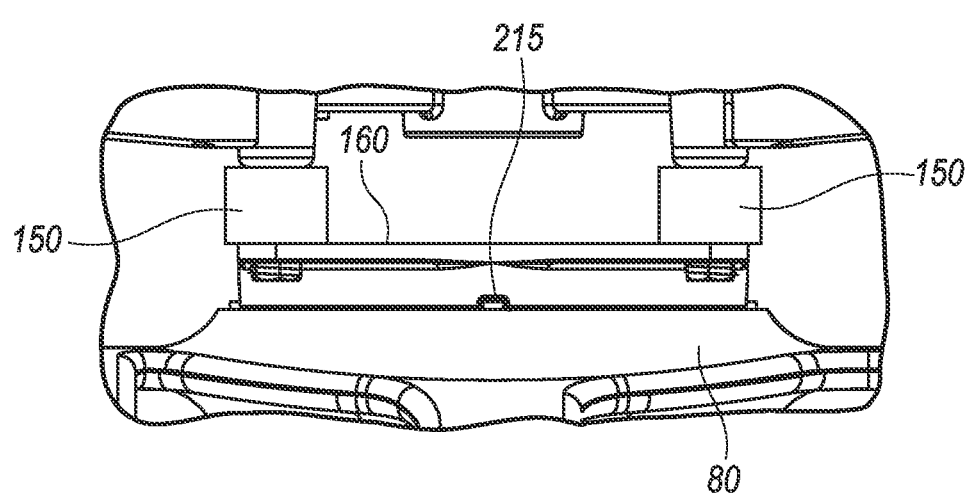
FIG. 3B illustrates a view of bushing visible in FIG. 3A.

Referring now to FIGS. 3A and 3B, FIG. 3A illustrates a side view of the exemplary press in the closed position, and FIG. 3B illustrates a view of bushing visible in FIG. 3A. Rubber bushings 150 support lower platen 110, which are supported by base casting 80 having apertures 200. Upper swing arm 20 includes swing arm 130 (visible in other figures) having swing arm handle 290 that provides a hand-hold (i.e., knob) or swing arm handle 290 to swing the heater back and forth without touching the (somewhat hot) heater cover or upper platen 100. It is especially used to swing the heater towards you (as the user) as it is otherwise difficult to reach any other part of the upper portion from the operator position. Control housing 50 is supported by Z-bracket support 70 and includes controller readout 240 coupled to a proximity sensor.

FIGS. 3A and 3B show bushings 150 in relation to lower platen 110 and base casting 80. Bushings 150 provide a damping effect when upper platen 100 is compressed against lower platen 110 via print handle 10. That is, when print handle 10 is pulled forward, linkage 90 causes a piston rod 70 to press upper platen 100 downward and against lower platen 110. As pressure builds, bushings 150 are caused to flex, and unevenness therebetween is automatically compensated because bushings 150 will flex, accordingly. That is, if a greater pressure is applied on one end of lower platen 110 (such as if the platens 110, 110 are not parallel, and/or if a garment does not have uniform thickness), then bushings 150 react accordingly to even out the pressure. In addition, upper swing arm 20 is supported via support post 310, and according to the disclosure, when pressure is applied between platens 100, 110, not only do bushings 150 flex, but support post 310, upper swing arm 20, and related components all flex as well, providing further benefit to the pressing process by further providing for a uniform, and not excessive, pressure being applied.

Figure 4A:
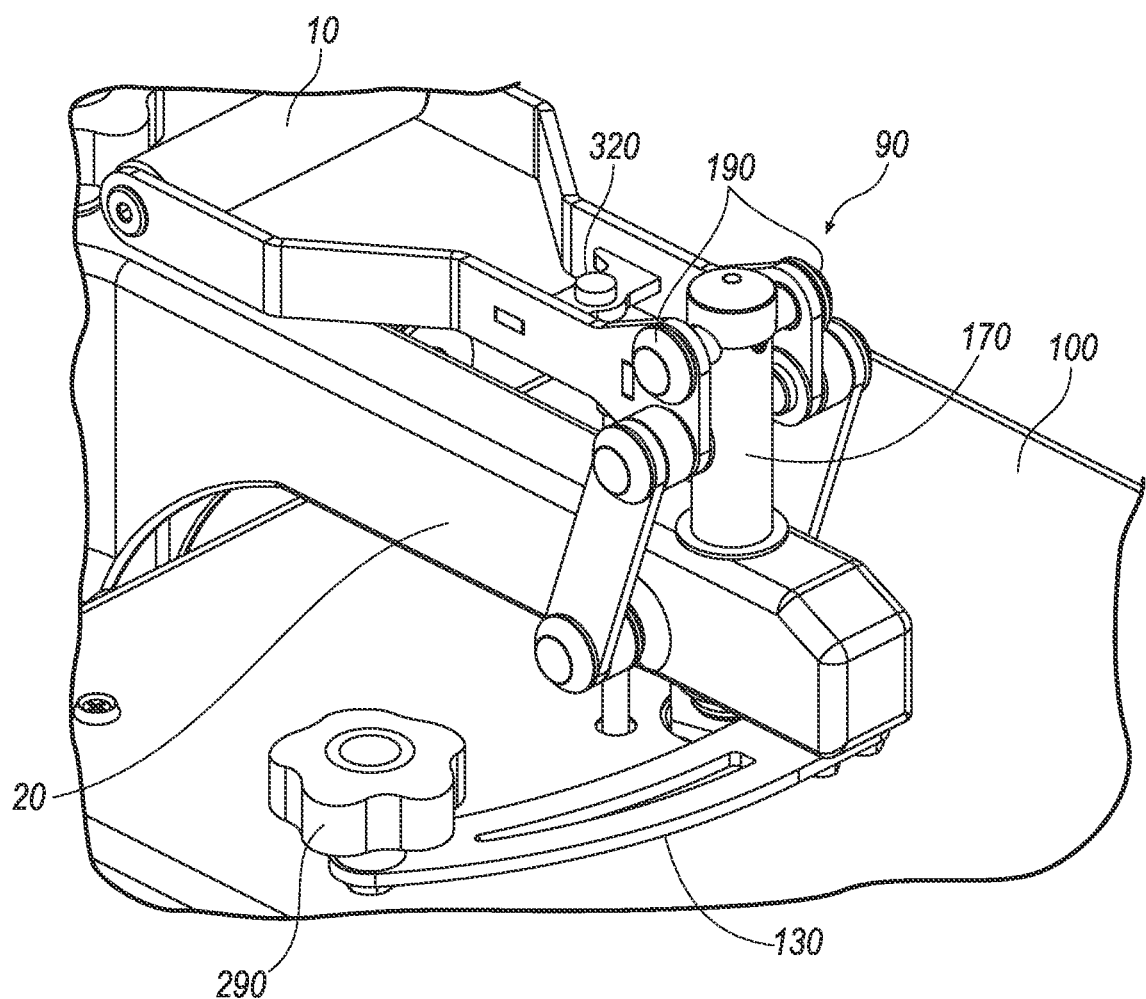
FIG. 4A illustrates a linkage for operating the press, in the open position.
Figure 4B:
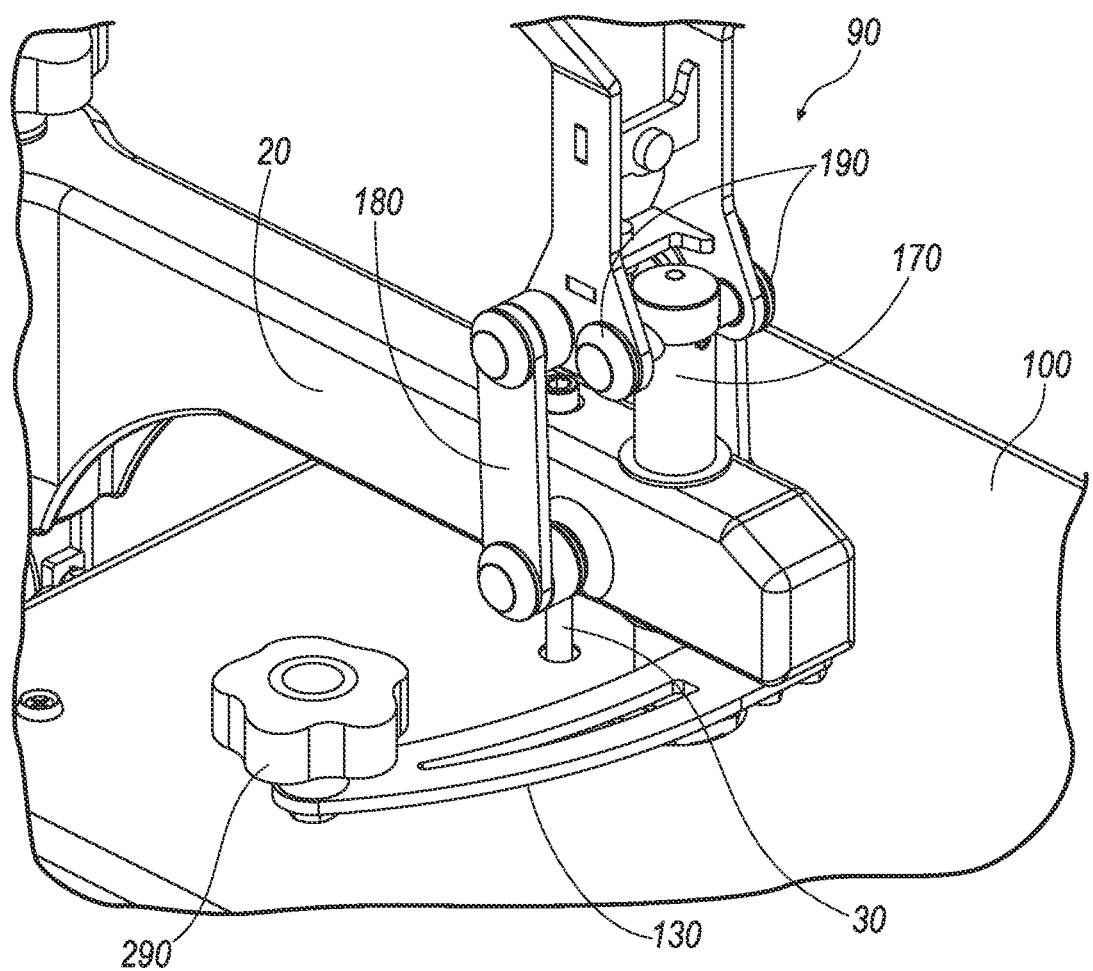
FIG. 4B illustrates the linkage for operating the press, in the partially open position.
Figure 4C:
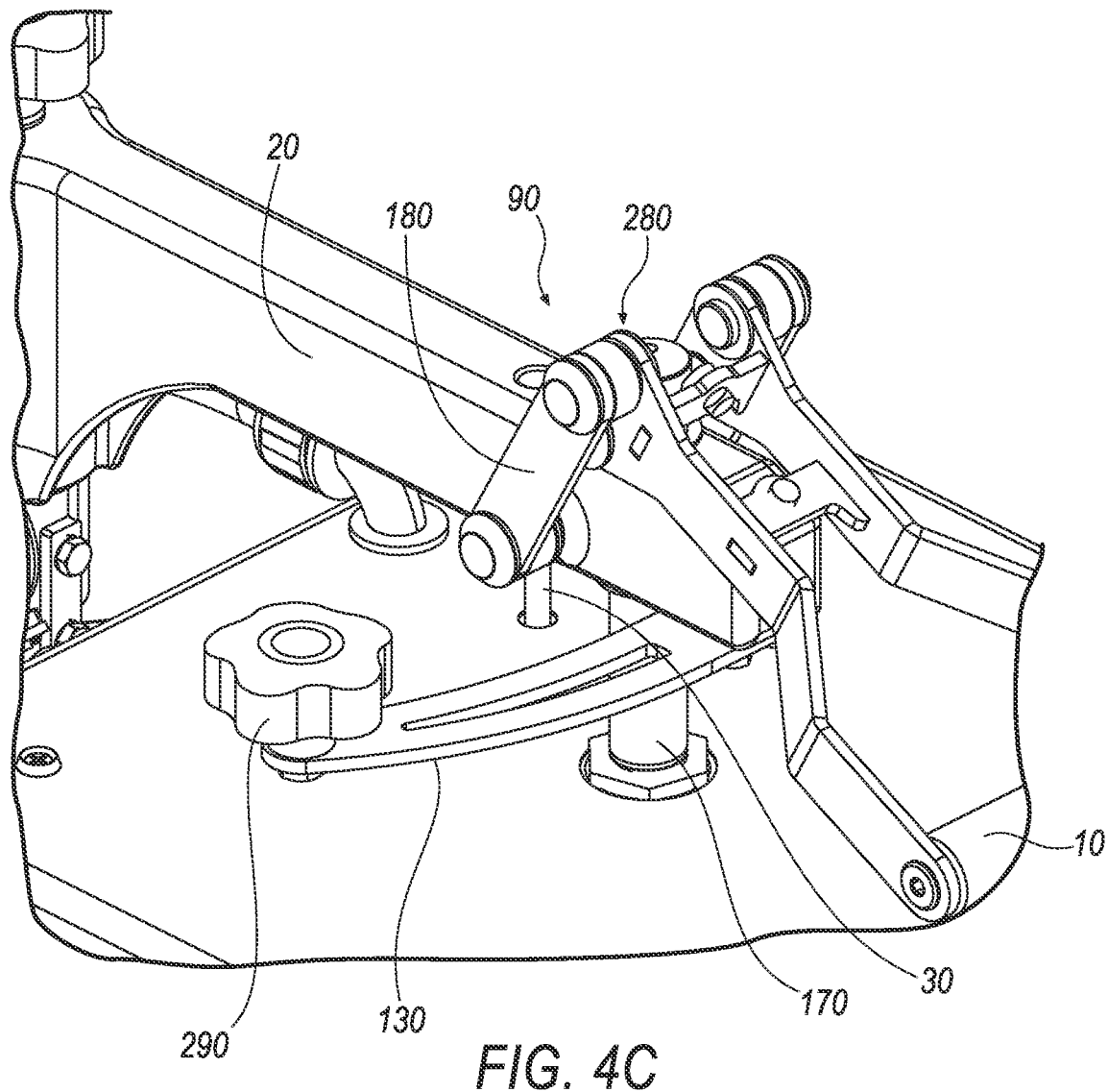
FIG. 4C illustrates the linkage for operating the press, in the closed position.

FIGS. 4A, 4B, and 4C illustrate linkage for operating the press, respectively, in open, partially open, and in closed position. Print handle 10 is connected to piston rod 170, and likewise includes a coupler or follower 180 that is rotationally coupled to upper swing arm 20. Coupler or follower 180 is coupled to piston rod 170 via input link 190. As such, application of force to print handle 10 results in a forward and downward motion being applied to input link, shown progressively to be occurring in FIGS. 6A, 6B, and 6C. According to the illustrated example, print handle 10 may have positioned thereon a first bumper 320 and/or a second bumper 330 which may soften or dampen engagement of print handle 10 during operation. First bumper 320 engages with upper swing arm 20 when print handle 10 is pulled fully forward and when piston rod 170 is engaged, and second bumper 330 rests against the surface of piston rod 170 when print handle 10 is fully open and when piston rod 170 is fully retracted and disengaged.

FIG. 4C shows heat press 5 having print handle 10 positioned such that upper platen 100 is engaged against lower platen 110 by manual application of pressure via print handle 10. Engagement of linkage 90 causes pressure to be applied to upper platen 100 via piston rod 170. The ultimate amount of pressure to be applied between platens 100, 110 can be adjusted by adjusting a start height of upper platen 100 via pressure adjuster 40 which, when rotated, causes upper platen 100 to move up and down prior to engagement of the platens.

Thus, linkage 90, including piston rod 170, and coupler or follower 180 are rotationally coupled to upper swing arm 20. Coupler or follower 180 is coupled to piston rod 170 via input link 190. Gap 280 is formed in linkage and visible on the top of linkage 90 in FIG. 4C. Gap 280 is present such that visible pins to either side individually link with coupler or follower 180. As seen in FIG. 4C, it is clear that the pins that form gap 280 are above piston rod 170 in the exemplary design. Thus, if instead of gap 280 a full pin is provided, it will not interfere with piston rod 170 when in this position. However, when linkage 90 is positioned as in FIG. 4A, clearly, gap 280 seen in FIG. 4C overlaps with that of piston rod 170 and, in an example where a full pin is provided, it would thereby interfere or contact piston rod 170. In such an arrangement, a cutout or "scallop" in either the pin or in piston rod 170 may be provided to accommodate additional range of motion when in the fully open position.

Figure 5A:
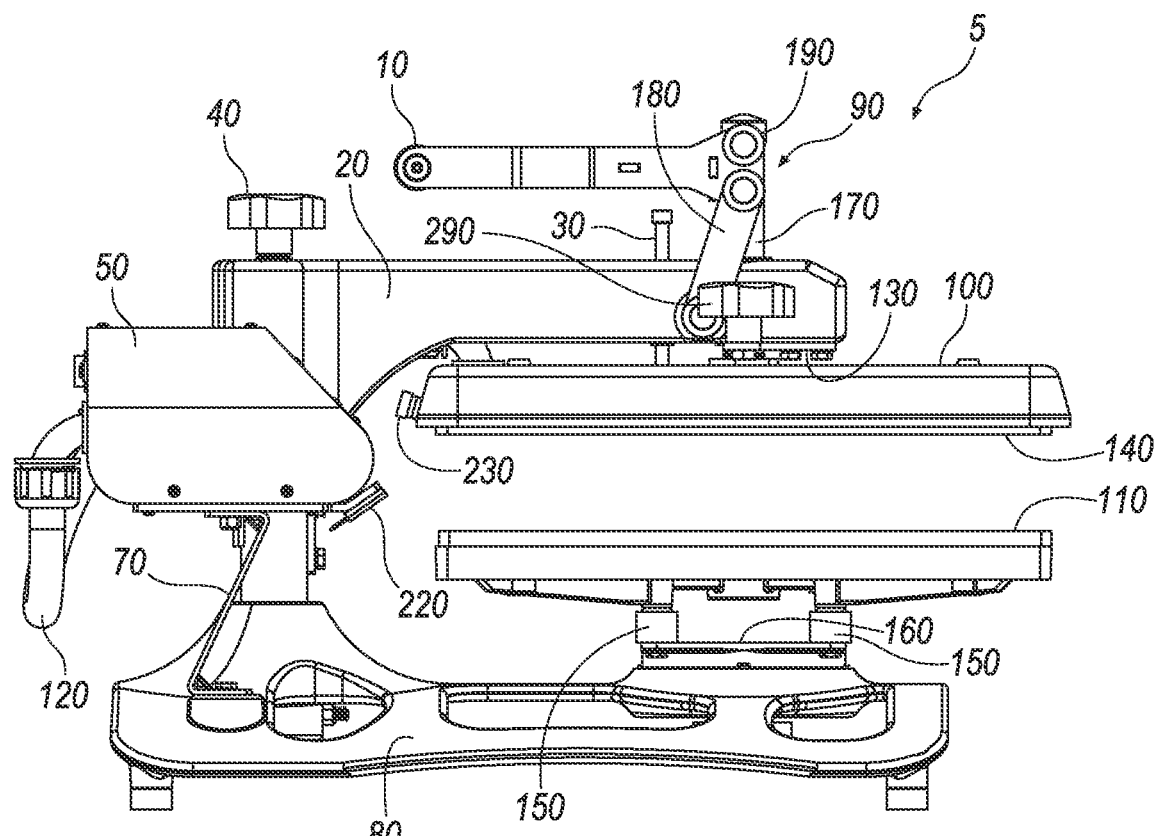
FIG. 5A illustrates the press opposite that of FIG. 3A, in the open position.
Figure 5B:
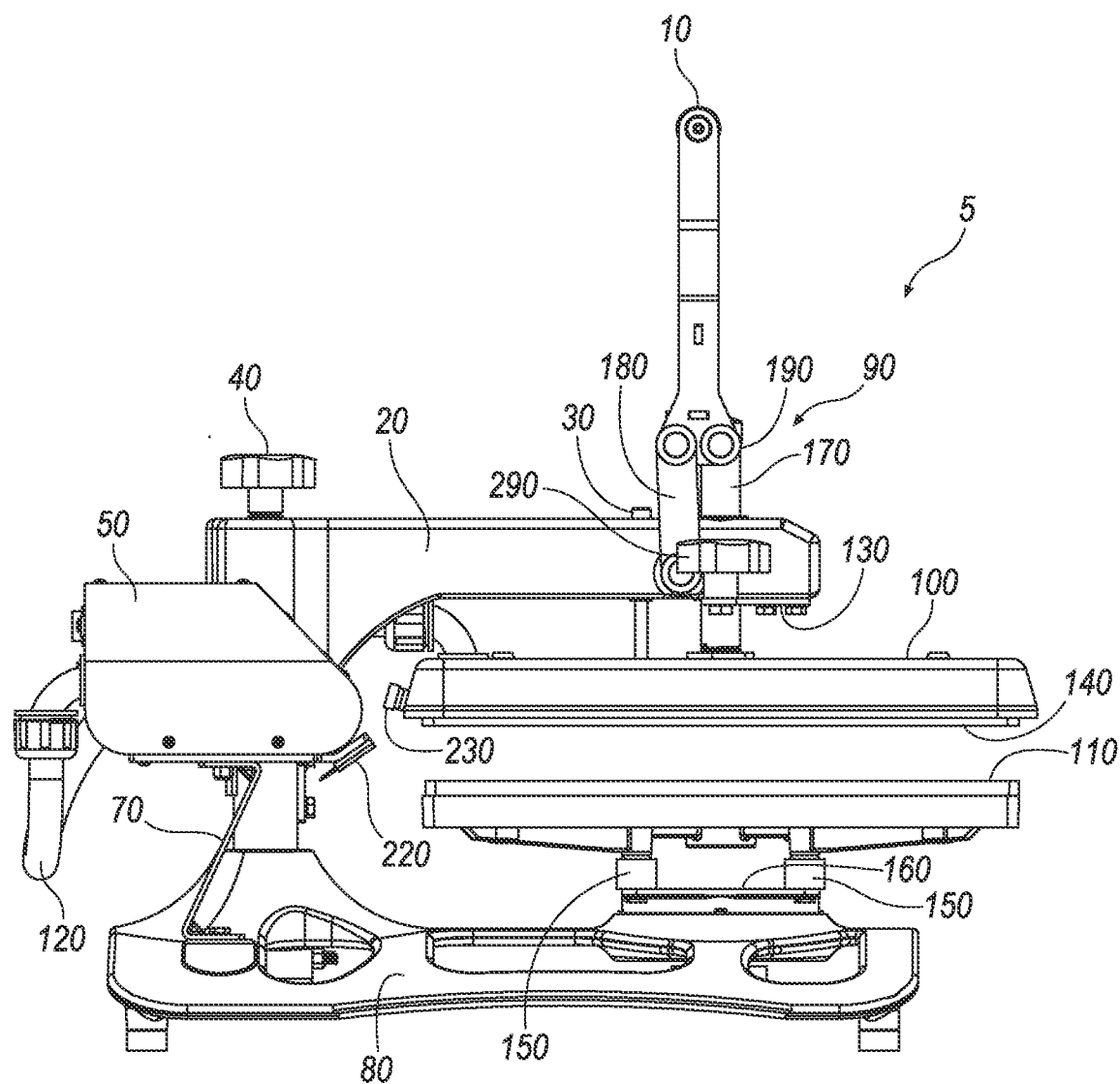
FIG. 5B illustrates the press opposite that of FIG. 3A, in the partially open position.
Figure 5C:
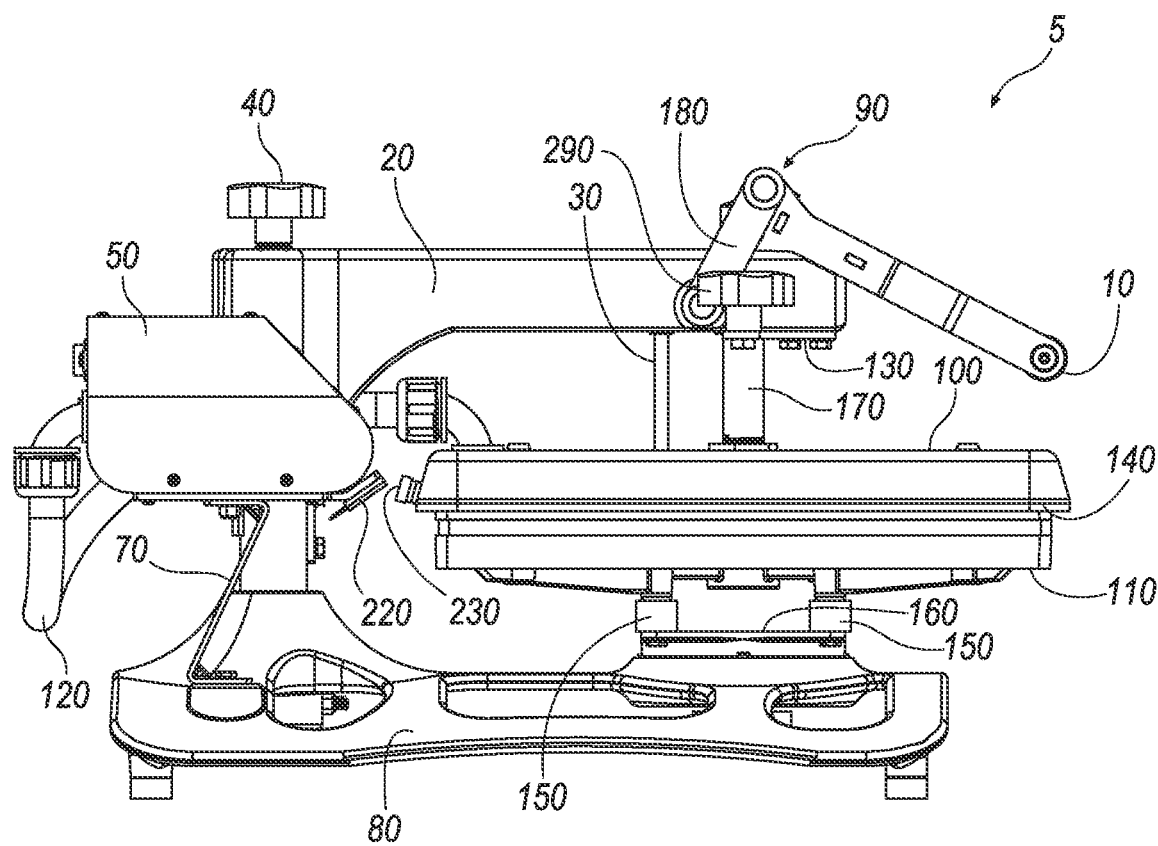
FIG. 5C illustrates the press opposite that of FIG. 3A, in the closed position.

FIGS. 5A, 5B, and 5C illustrate the press from a view opposite that of FIGS. 3A, 3B, and 3C, with the press respectively in the open position, the partially open position, and in the closed position. Press 5 includes a proximity sensor that includes a proximity sensor first component 220 and a proximity sensor second component 230. Controller readout 240 indicates, for example, a readout corresponding with whether lower platen 110 and upper platen 100 are engaged, and/or timing, temperature, and pressure settings.

Sensor first component 220 and proximity sensor second component 230 together make a proximity sensor for determining and providing an output that indicates when platens 100, 110 are pressed together. In one example, the proximity sensor may emit an electromagnetic field or a beam of electromagnetic radiation (infrared, for instance), and look for changes in the field or return signal. The object being sensed may be referred to as the proximity sensor's target. Different proximity sensor targets may include different sensors. For example, a capacitive proximity sensor or photoelectric sensor might be suitable for a plastic target, and an inductive proximity sensor always requires a metal target.

First component 220 and proximity sensor second component 230 are shown in a first "uncompressed" location in FIG. 5, and a fully "compressed" location in FIG. 5C, with FIG. 5B being intermediate between them. Correspondingly, first component 220 and proximity sensor second component 230 thereby cause different signals to be output from first component 220 between the two locations, which are conveyed to control housing 50 for display. The proximity sensor may include a magnetic proximity switch that runs for a pre-set time in the controller once the proximity is detected and then audible or other notice to indicate a predetermined time has passed.

In the example of an inductive proximity sensor, since the output of an inductive sensor has two possible states, an inductive sensor is sometimes referred to as an inductive proximity switch. The sensor consists of an induction loop or detector coil. Often this is physically a number of turns of insulated magnet wire wound around a high magnetic permeability core, such as a ferrite ceramic rod or coil form, and the winding may or may not have a feedback tap some number of turns from one end of the total winding. It is connected to a capacitance to form a tuned frequency oscillator tank circuit. In conjunction with a voltage or current gain device like a transistor or operational amplifier, this forms a tuned frequency oscillator. When power is applied, the resulting oscillation is a high frequency alternating electric current in the coil that has a constantly changing magnetic field able to induces eddy currents in proximal (target) conductors. The closer the target is and the greater its conductivity (metals are good conductors, for example), the greater the induced eddy currents are and the more effect their resulting opposing magnetic fields have on the magnitude and frequency of the oscillation. Its magnitude is reduced as the load is increased in a non-magnetic conductor like aluminum because the induced field in the target opposes the source induction field, lowering net inductive impedance and therefore simultaneously tuning the oscillation frequency higher. But that magnitude is less affected if the target is a highly magnetically permeable material, like iron, as that high permeability increases the coil inductance, lowering the frequency of oscillation.

A change in oscillation magnitude may be detected with a simple amplitude modulation detector like a diode that passes the peak voltage value to a small filter to produce a reflective DC voltage value, while a frequency change may be detected by one of several kinds frequency discriminator circuits, like a phase lock loop detector, to see in what direction and how much the frequency shifts. Either the magnitude change or the amount of frequency change can serve to define a proximity distance at which the sensors go from on to off, or vice versa.

FIGS. 5A to 5C also show safety bolt safety bolt 30 within a hole or aperture of upper swing arm 20. Thus, in case of support failure of the primary mounting, safety bolt 30 provides a catch mechanism to prevent injury, preventing upper platen 100 from falling in the event of a material failure. Safety bolt 30 also keeps upper platen 100 aligned rotationally with upper swing arm 20. The figures likewise show safety bolt 30, passed through upper swing arm 20, and including an end on the underside of upper swing arm 20 that will catch upper swing arm 20 in the event that failure occurs, such as in piston rod 170.

Figure 6:
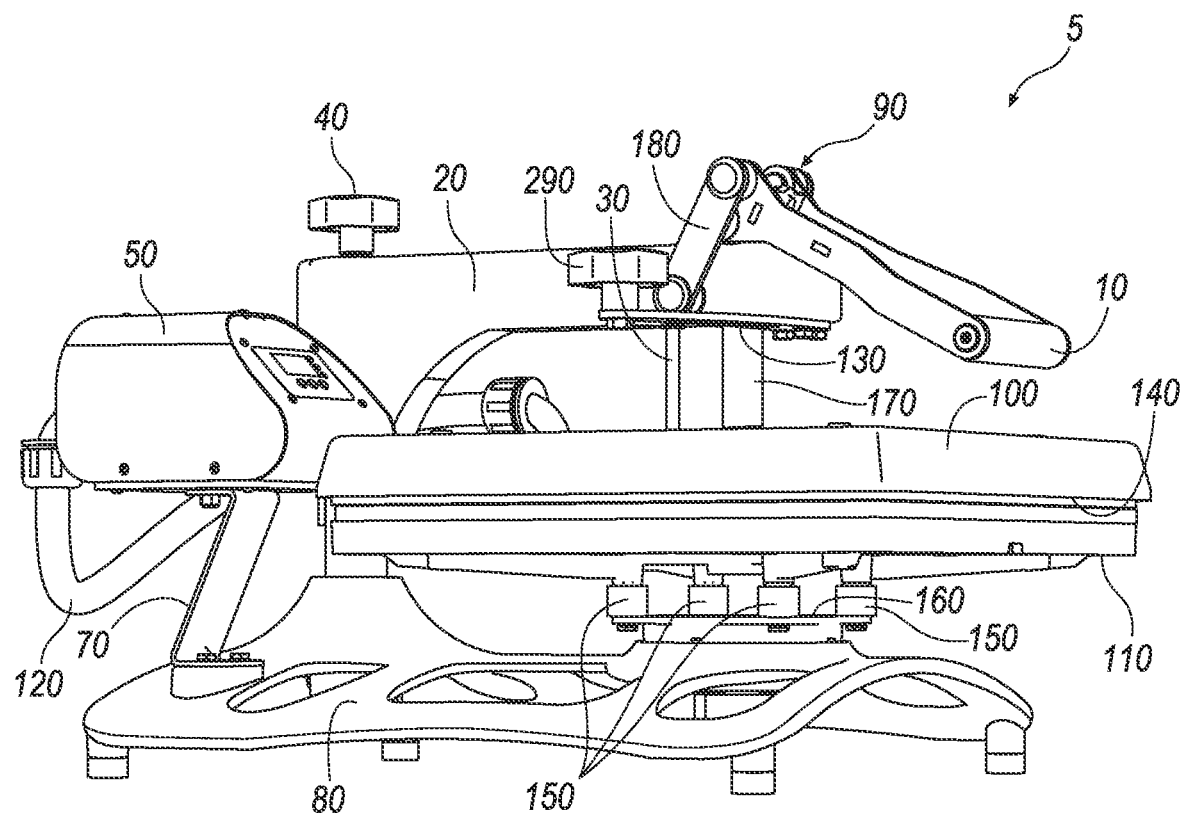
FIG. 6 illustrates a front/side angled view showing aspects of a Z-bracket.
Figure 7:
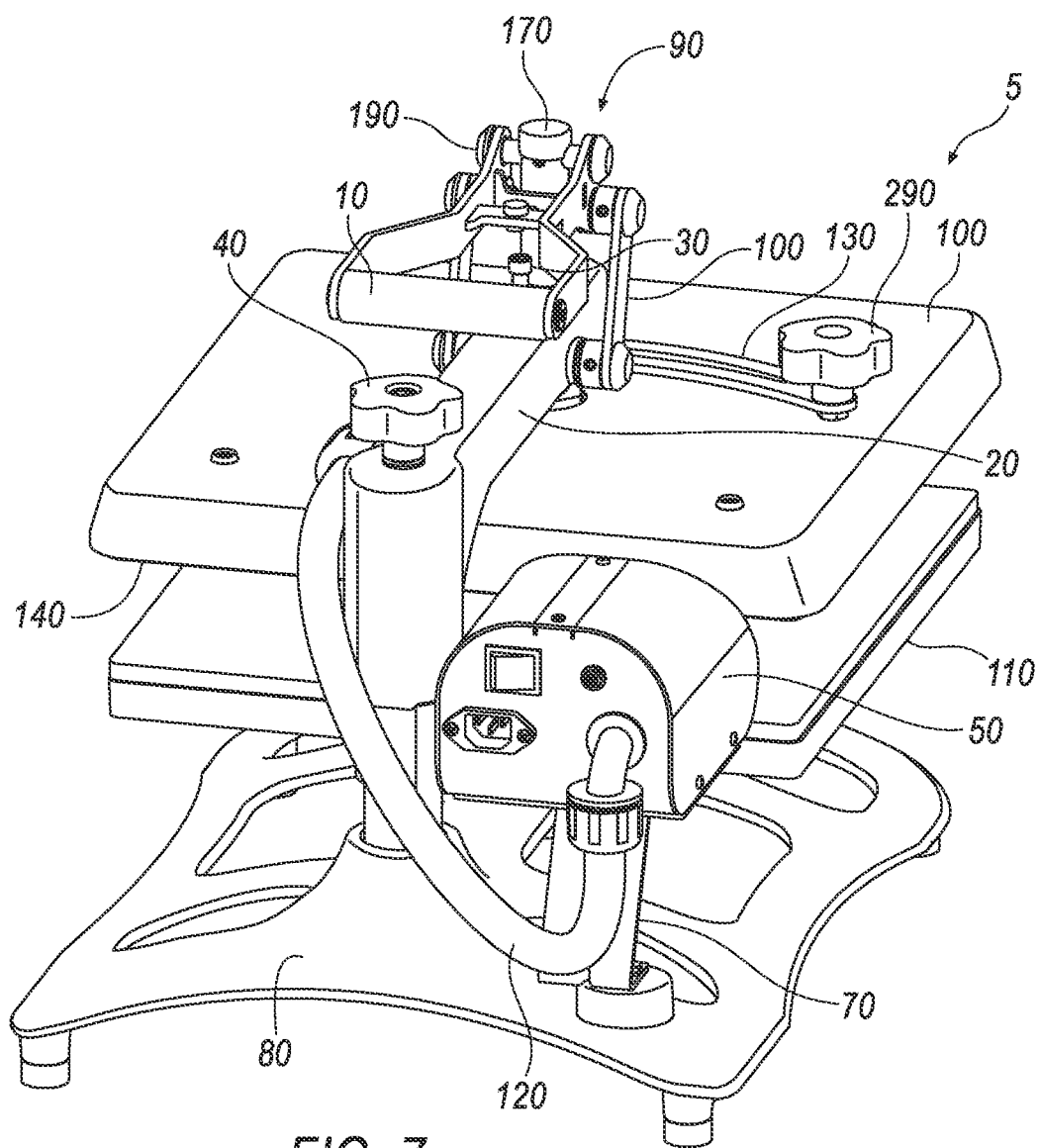
FIG. 7 illustrates a back side of the press.

FIG. 6 illustrates a front/side angled view showing aspects of a Z-bracket, and FIG. 7 illustrates a back side of the press. Control housing 50 is supported by Z-bracket support 70 that is hard-mounted to base casting 80. Cable housing 120 is connected to control housing 50 and to upper platen 110. Cable housing 120 also includes other electrical components for conveying electrical signals related to operation of heat press 5. For instance, cable housing 120 may carry signals related to pressure, temperature, and a location of upper platen 100 (determined via a proximity sensor). Because cable housing 120 is hard-connected to base casting 80, operation of heat press 5 is facilitated because a user can rotate upper platen 100 without having control housing 50 rotate with it. Control settings and other features entered into and viewed from control housing 50 is thereby facilitated since the user does not have to turn along with the rotation of upper platen 100, as would need to be done if control housing 50 were mounted onto or coupled with upper platen 100. This feature (stationary control housing 50 with respect to base casting 80) is beneficial in that there is a physical separation between upper swing arm 20 and control housing 50, which facilitates operation of features on control housing 50 whether upper swing arm 20 is moved or rotated out of the way, or not. An operator may operate control housing 50 by changing heat settings, power settings, proximity sensor settings, and the like, and the disclosed configuration makes it easy and convenient to do so regardless of the position of upper swing arm 20. Z-bracket support 70 supports control housing 50 on base casting 80. As discussed, Z-bracket support 70 therefore, being hard mounted, does not rotate with the upper platen when it is rotated during operation.

Figure 8A:
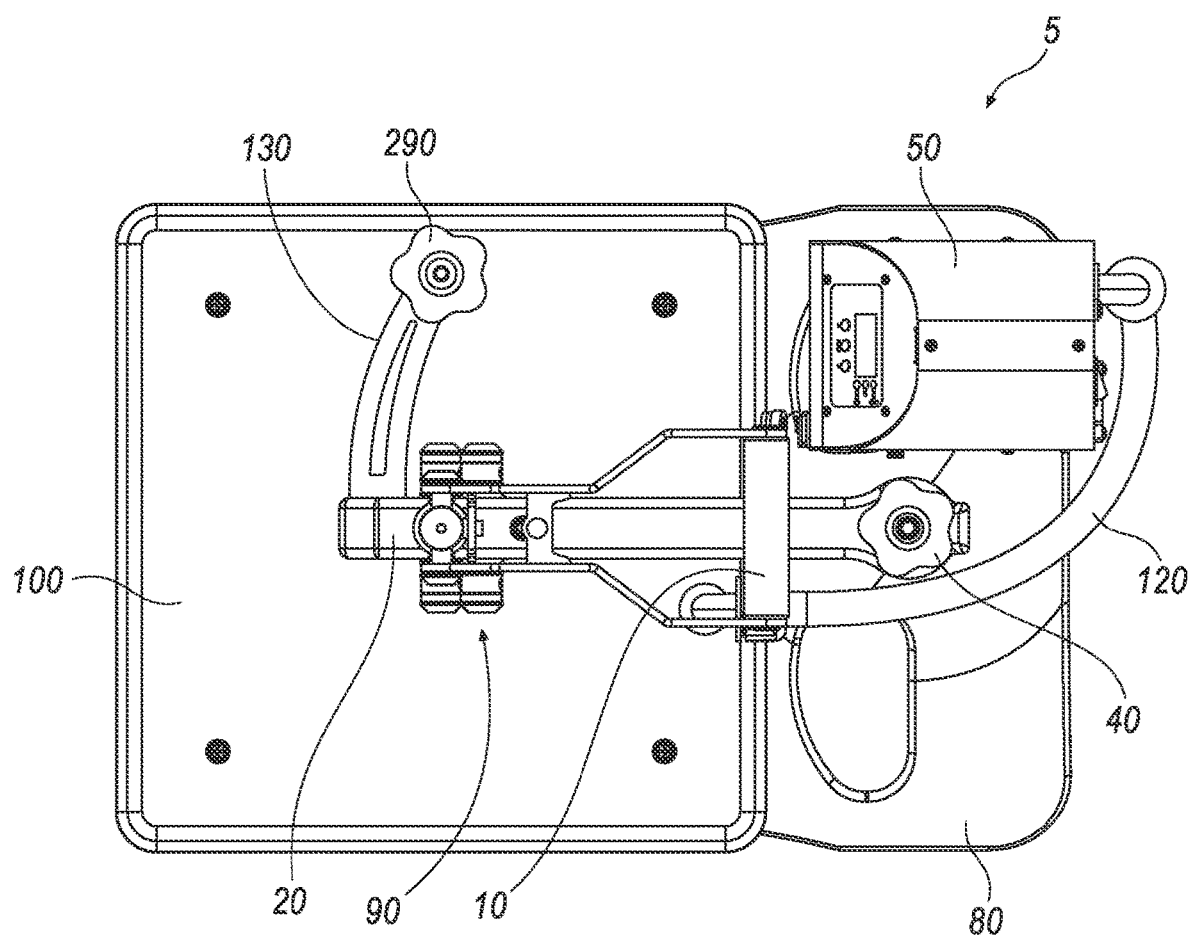
FIG. 8A illustrates a top view of the press in an open position with platens aligned.
Figure 8B:
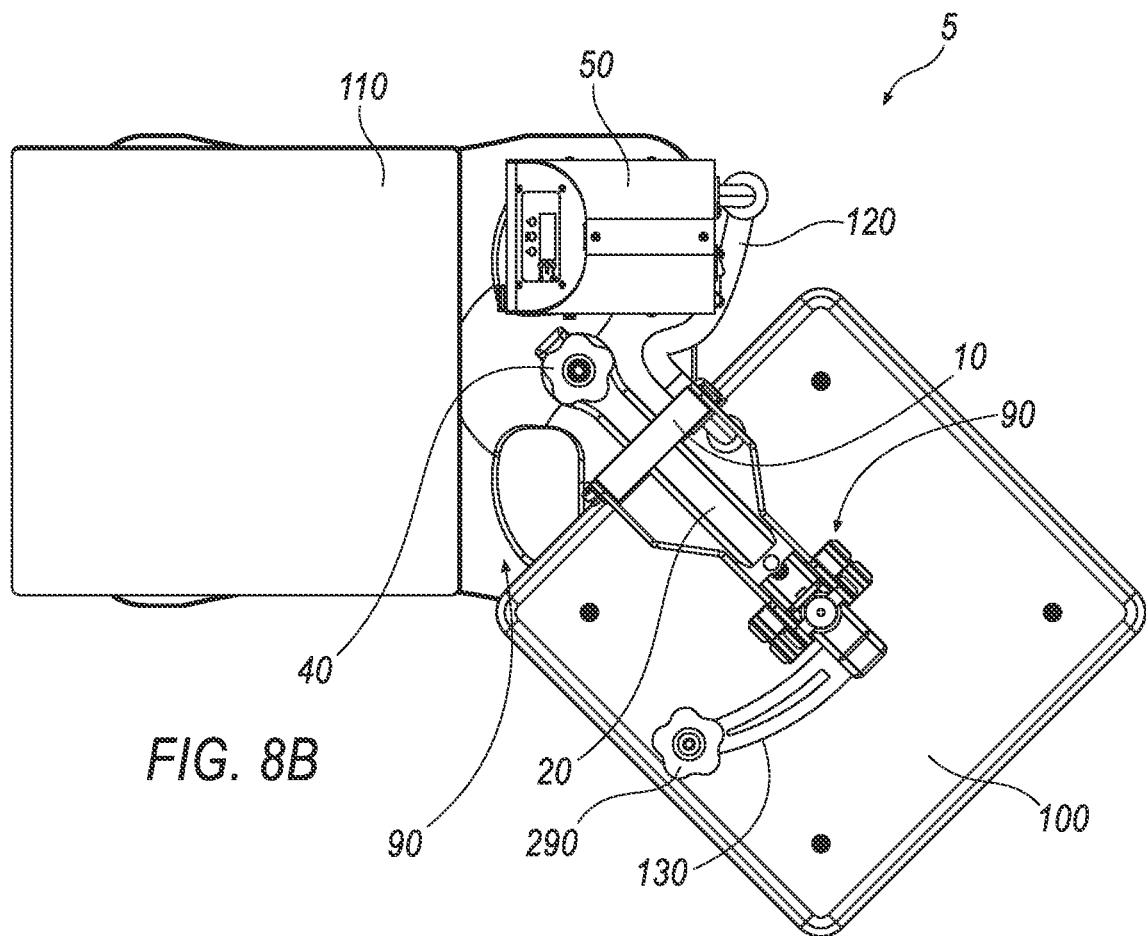
FIG. 8B illustrates the top view with an upper platen in a rotated position.
Figure 8C:
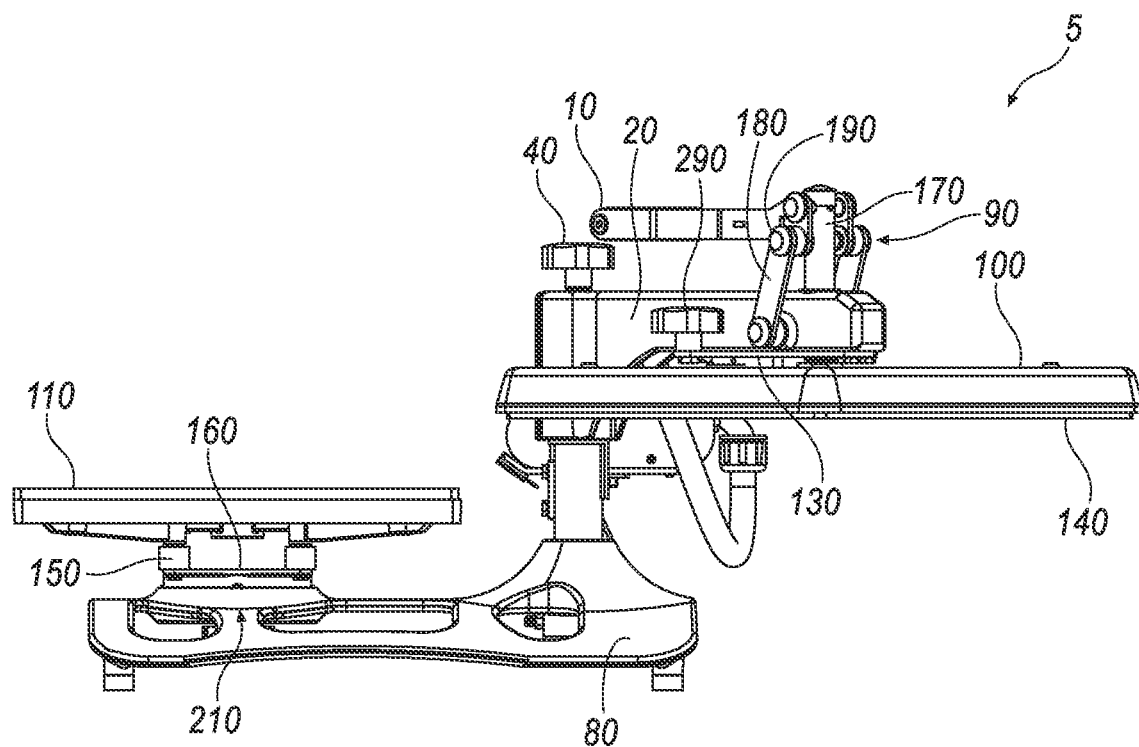
FIG. 8C illustrates a side view with the upper and lower platens rotated apart.

FIG. 8A illustrates a top view of the press in an open position with platens aligned, FIG. 8B illustrates the top view with an upper platen in a rotated position, and FIG. 8C illustrates a side view with the upper and lower platens rotated apart. The rotation is within a range defined by collar 250, collar cutout 260, and collar stop 270, as further discussed in FIGS. 10A-10C. FIG. 8C shows a side view of heat press 5 with upper platen 100 in its extreme position rotated away from lower platen 110.

Figure 9:
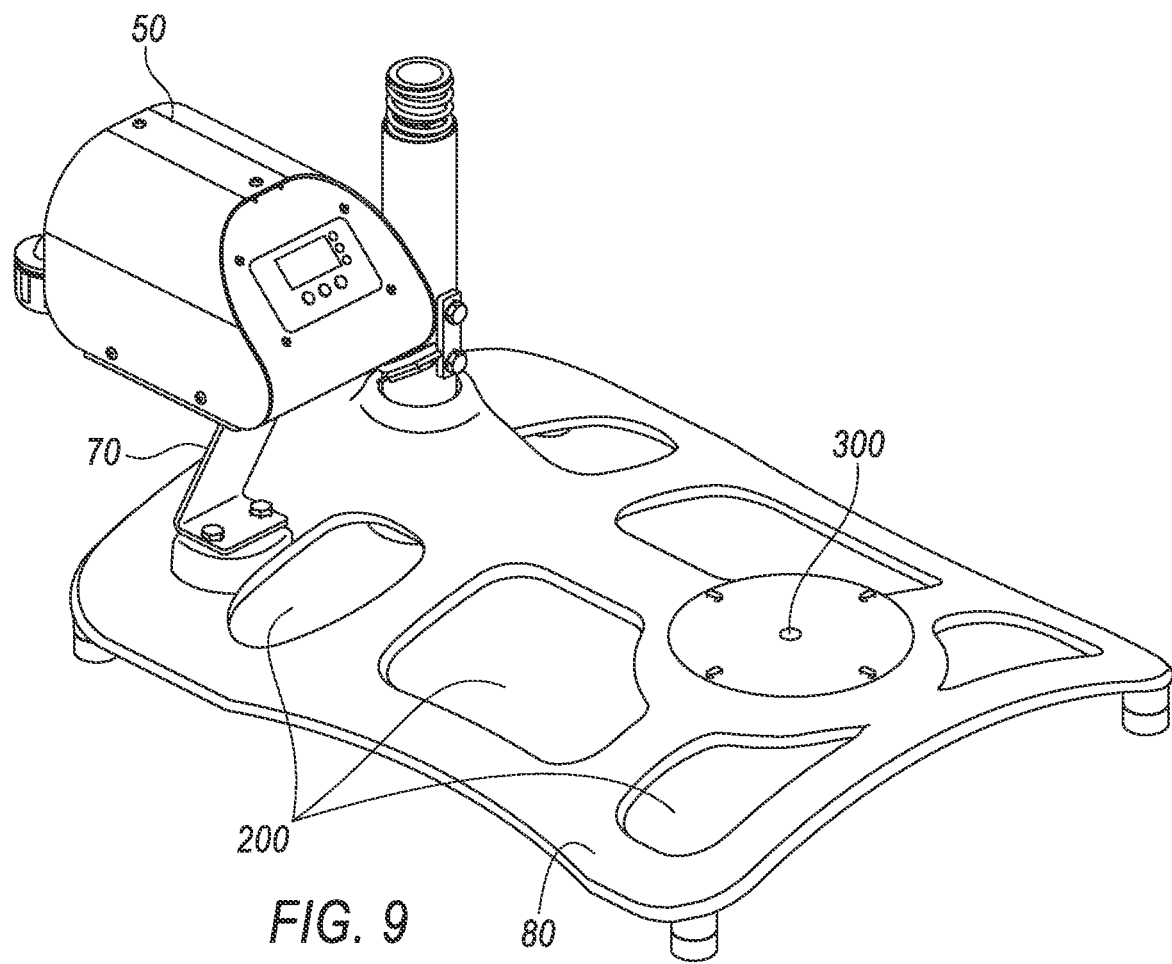
FIG. 9 illustrates a base casting having a control housing mounted with the Z-bracket.

FIG. 9 illustrates a base casting having a control housing mounted with the Z-bracket, illustrating the ability to remove and replace lower platen 100, facilitating the use of different sized platens. Lower platen 110 is attached via lower platen base 160 to base casting 80 via a hole or aperture 300.

Figure 10A:
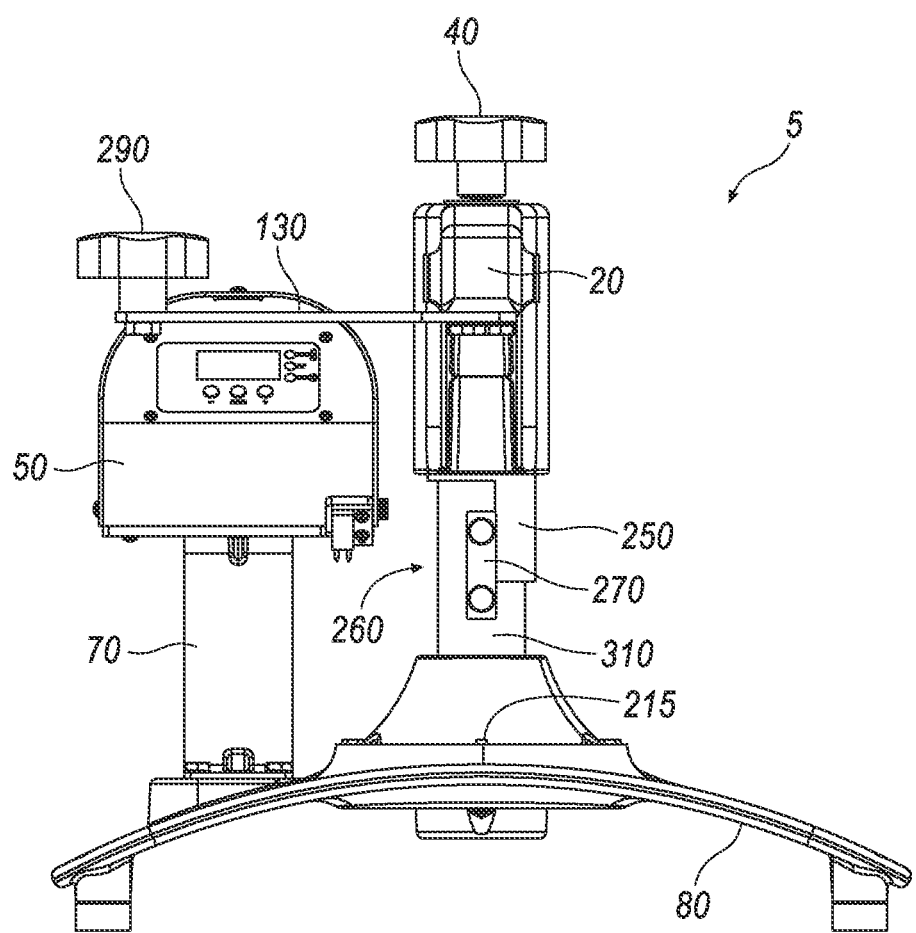
FIG. 10A illustrates a front view, without portions of the press present, to illustrate a collar and a stop in a first rotated position.
Figure 10B:
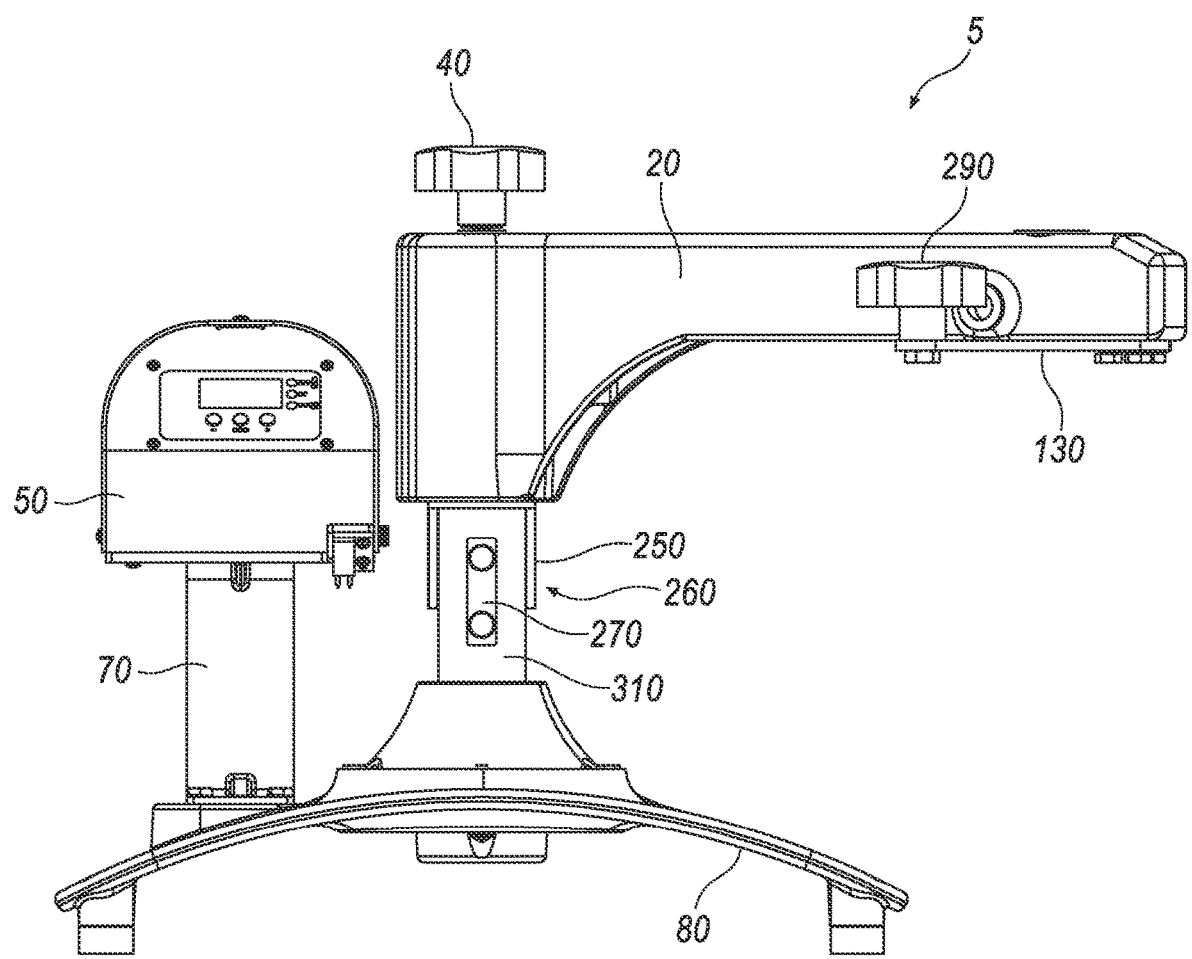
FIG. 10B illustrates a front view, without portions of the press present, to illustrate a collar and a stop in a second rotated position.
Figure 10C:
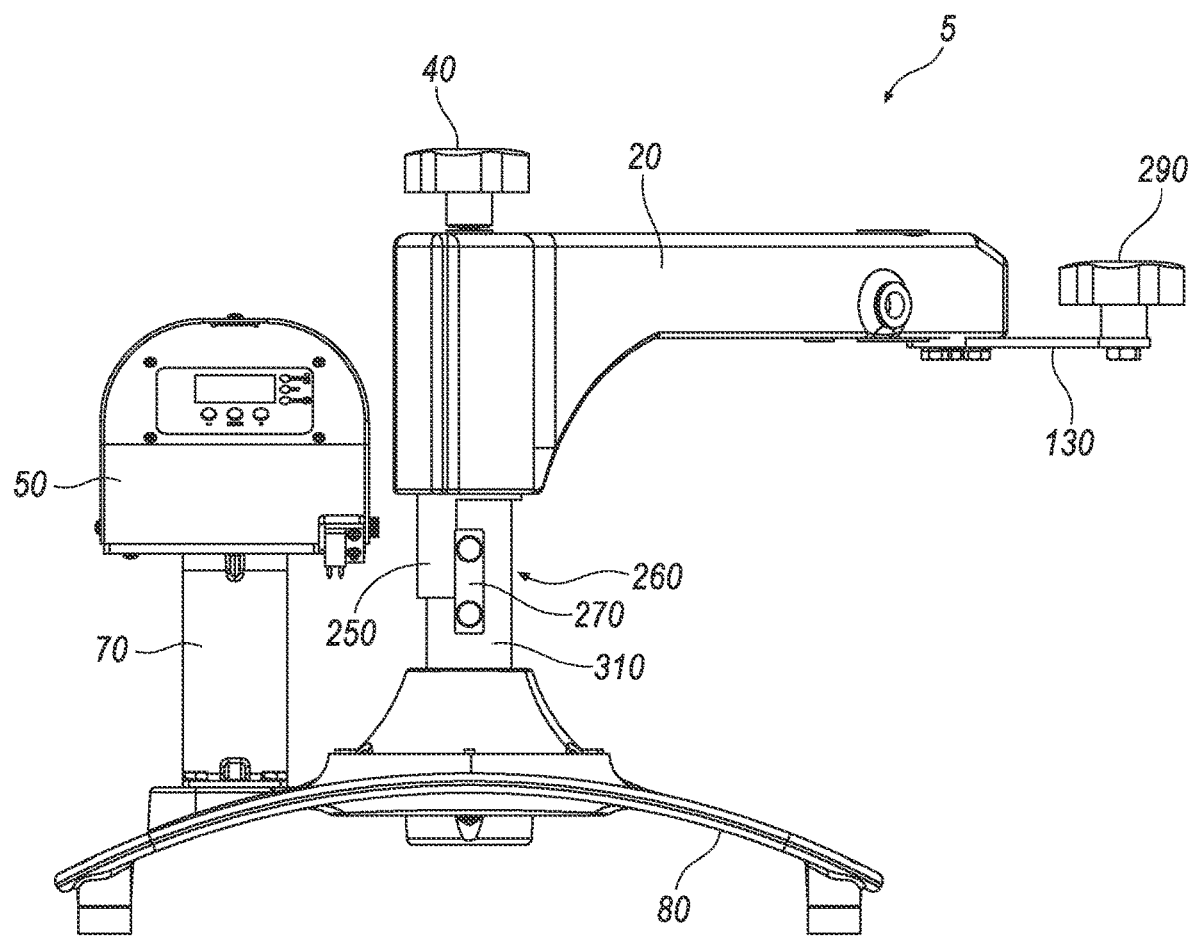
FIG. 10C illustrates a front view, without portions of the press present, to illustrate a collar and a stop in a third rotated position.

FIG. 10A illustrates a front view, without portions of the press present, to illustrate a collar and a stop in a first rotated position. FIG. 10B illustrates a front view, without portions of the press present, to illustrate a collar and a stop in a second rotated position. FIG. 10C illustrates a front view, without portions of the press present, to illustrate a collar and a stop in a third rotated position. The figures illustrate components related to operation of upper swing arm 20, and particularly with respect to collar 250, collar cutout 260, and collar stop 270, which limit rotational motion of upper swing arm 20. Collar stop 270 is attached to support post 310. A collar 250 is attached to upper swing arm 20, and collar 250 includes a cutout 260. FIGS. 10A, 10B, and 10C show these components at three different steps in the rotation. In FIG. 10A, collar 250 abuts collar stop 270 at one extreme of the rotation and in FIG. 10B the rotation is at mid-rotation. FIG. 10C shows collar 250 abutting collar stop 270 at the other extreme of the rotation. It is therefore possible to control the complete range of rotation of upper swing arm 20, and ultimately of upper platen 100, by properly sizing each of collar 250, collar cutout 260, and collar stop 270.

Referring to the figures in general, a bolt, tool-less threaded knob or other attachment device may be used, such as a threaded hole in lower platen base 160 proximate lower platen base aperture 210. A knob, such as is visible on the underside of base casting 80, as one example, may be used on an underside of lower platen base 160 and within lower platen base aperture 210 for removing components from base casting 80.

Various exemplary illustrations are provided herein of exemplary presses, e.g., for applying indicia to garments by application of heat. According to one exemplary illustration, a press may include an upper platen, and a lower platen disposed below and generally aligned with the upper platen. The press may further include a support head adapted to move the upper platen between an open position, wherein the upper and lower platens are spaced away from one another, and a closed position, wherein the upper platen is pressed against the lower platen. The exemplary presses may further include a stand or be positioned on a ground surface or a table surface. In some examples, the stand is adjustable between a plurality of heights.

According to the disclosure, a nominal or target print force of 700 lbs. is obtained. The dampers (rubber bushings 150) are favorable over, for instance, springs, and provide for compliance allows platen movement relative to frame, improving evenness of print pressure; damping of rubber reduces vibration, improving machine reliability (screw connections, solder joints, etc. can degrade from vibrations);

damping of rubber reduces unwanted oscillations of platen during use, improving ergonomics and feeling of quality; and rubber damper assembly is more economical and easier to assemble than die springs with shoulder bolts As such the disclosed press is able to operate in a variety of tight environments due to the many features. That is, the disclosed low profile heat press is operable in many tight environments because of its low-profile, because of its ability to compactly operate the press via the linkage and press handle, because of its low profile cast base, because of the ability to sense press height and provide feedback of the height to an operator, and because of the ability to limit rotational range of the press. Further, the stationary control readout avoids movement of the relatively bulky readout to the user, while allowing the user to swing the upper platen to the side while not having to also move along with the rotation of the platen in order to read its values or input settings thereto.

The disclosed subject matter therefore includes minimal gap between heater & upper arm (all the compliance structure is under the platen where more space for garment clearance is beneficial, instead of above the heater); the print handle end positions maintain low profile (i.e. the handle doesn't stick straight up making it more difficult to store).

Height of the disclosed heat press includes a total height of 16-19", a width of 16", a depth of 27", a platen height of 6", and a clearance around the platens of 3". This is in contrast to known heat presses that occupy a larger profile or volume, and are generally much higher. The low profile or volume is obtained due to the compact nature of the base casting, its support for the bushings, and the support of the lower platen. In addition, the overall package height is minimized due to the additional impact of the print handle and its operation via the linkage to raise and lower the upper platen.

The opening between platens, according to one example, is 2", with 0.5" adjustment via the pressure adjuster. As such, the opening between platens is 2-2.5", according to one example.

Thus, the conditions for setup, takedown, and operation in cramped and inconvenient locations is improved because of the compact design.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A heat press comprises:
   a lower platen attached to a base;
   an upper swing arm attached to the base;
   a piston rod;
   a print handle;
   an upper platen coupled to the upper swing arm via the piston rod, and operable via a linkage, the linkage including a coupler linked between the upper swing arm and the print handle, and the linkage including an input link that rotationally couples the print handle to the piston rod such that a motion of the print handle moves the piston rod up or down through the linkage, depending on a direction of motion of the print handle; and
   a heater positioned in at least one of the upper platen and the lower platen;
   a control housing that is electrically coupled to the heater and attached to the base, the control housing comprising a controller readout;
   wherein the upper swing arm is operable to rotationally swing the upper platen away from the lower platen and out of a substantially parallel alignment with the lower platen when the print handle is positioned such that the upper platen is positioned above and not in contact with the lower platen; and
   wherein the control housing remains in a stationary position regardless of a position of the upper swing arm and the controller readout remains above the upper platen when the upper platen is positioned above and not in contact with the lower platen.

2. The heat press of claim 1, wherein operation of the linkage via the print handle causes the upper platen and the lower platen to engage against one another when the print handle is in a forward position.

3. The heat press of claim 1, further comprising a proximity sensor coupled at least in part to the upper platen for detecting proximity of the upper platen with respect to the lower platen.

4. The heat press of claim 3, wherein:
   the proximity sensor includes a first component coupled to the control housing and a second component coupled to the control housing;
   the control housing includes at least one of an audio or visual indicator; and
   the at least one audio or visual indicator is configured to provide a warning to a user if a certain height of the upper platen is exceeded and sensed by the proximity sensor.

5. The heat press of claim 1, wherein the linkage includes two couplers that couples the piston rod to the print handle, the two couplers forming a gap through which the piston rod passes during a rotational motion of the print handle.

6. The heat press of claim 5, wherein the base includes a upwardly facing convex profile.

7. The heat press of claim 5, further comprising rubber bushings between the base and the lower platen.

8. The heat press of claim 5, further comprising a swing arm handle coupled to the upper platen and to the upper swing arm; and
wherein the swing arm handle is operable to rotationally swing the upper platen via the upper swing arm about a vertical axis.

9. The heat press of claim 5, wherein the heater is positioned in the upper platen.

10. A method of fabricating a heat press, comprising:
attaching a lower platen to a base;
attaching an upper swing arm to the base;
providing a piston rod and a print handle;
providing an upper platen;
providing at least one of the upper platen and the lower platen with a heater;
coupling the upper platen to the upper swing arm via the piston rod, operable via a linkage, the linkage including a coupler linked between the upper swing arm and the print handle, and the linkage including an input link that rotationally couples the print handle to the piston rod such that a motion of the print handle moves the piston rod up or down through the linkage, depending on a direction of motion of the print handle;
electrically coupling a control housing to the heater and providing the control housing on a base, the control housing comprising a controller readout;
providing the upper swing arm such that the upper swing arm is operable to rotationally swing the upper platen away from the lower platen about a vertical axis when the print handle is positioned such that the upper platen is positioned above and not in contact with the lower platen; and
positioning the control housing such that the control housing remains in a stationary position regardless of a position of the upper swing arm and the controller readout remains above the upper platen when the upper platen is above and not in contact with the lower platen.

11. The method of claim 10, wherein operation of the linkage via the print handle causes the upper platen and the lower platen to engage against one another when the print handle is in a forward position.

12. The method of claim 10, further comprising coupling a proximity sensor at least in part to the upper platen for detecting proximity of the upper platen with respect to the lower platen.

13. The method of claim 12, wherein coupling the proximity sensor further includes coupling a first component to the control housing and a second component to the control housing such that an audio or visual indicator provides a warning to a user if a certain height of the platen is exceeded.

14. The method of claim 10, wherein the linkage includes two coupler that couples the piston rod to the print handle, further comprising forming a gap through which the piston rod passes during a rotational motion of the print handle.

15. The method of claim 10, wherein the base includes a upwardly facing convex profile.

16. The method of claim 10, further comprising positioning rubber bushings between the base and the lower platen.

17. The method of claim 10, further comprising coupling a swing arm handle to the upper platen and to the upper swing arm;
wherein the swing arm handle is configured to operably rotate the upper swing arm and the upper platen about a vertical axis.

18. The method of claim 10, wherein providing the at least one of the upper platen and the lower platen with a heater further comprises providing the upper platen with the heater.

19. The heat press of claim 5, further comprising a safety bolt extending through an aperture of the upper swing arm and connected to the upper platen;
wherein the safety bolt is configured to catch on the upper swing arm and prevent the upper platen from falling during a mechanical failure of the piston rod.

20. The heat press of claim 5, wherein:
the upper swing arm is attached to the base via a support post;
a collar is attached to the upper swing arm;
a collar stop is attached to the support post;
the collar and the collar stop engage such that the upper swing arm is connected to the support post; and
the collar stop defines a range of rotation of the collar, such that the upper swing arm and upper platen rotate about a vertical axis of the support post within the range of rotation.

21. The heat press of claim 5, wherein the print handle includes at least one of a first bumper and a second bumper;
the first bumper positioned to limit an upward motion of the upper platen when the print handle is positioned such that the upper platen is positioned above and not in contact with the lower platen; and
the second bumper positioned to limit a downward motion of the upper platen when the print handle is positioned such that the upper platen is positioned in contact with the lower platen.

22. A heat press, comprising:
a lower platen attached to a base;
an upper swing arm attached to the base via a support post;
an upper platen attached to the upper swing arm, the upper swing arm extending over the upper platen;
a print handle;
a piston rod coupling the upper platen to the upper swing arm;
a heater positioned in at least one of the upper platen and the lower platen; and
a control housing that is electrically coupled to the heater and attached to the base;
wherein the upper swing arm contains a linkage, the linkage including a coupler attached to the upper swing arm, the piston rod, and the print handle, and the linkage including an input link that rotationally couples the print handle to the piston rod, such that rotational motion of the print handle moves the piston rod up or down through the linkage;
wherein the upper swing arm is operable to rotate the upper platen about an axis of the support post when the print handle is rotated such that the upper platen is positioned above and not in contact with the lower platen; and
wherein the control housing remains stationary and above the upper platen when the upper platen is not in contact with the lower platen.

* * * * *